United States Patent
Inoue et al.

(10) Patent No.: US 10,946,250 B2
(45) Date of Patent: *Mar. 16, 2021

(54) GOLF BALL

(71) Applicant: SUMITOMO RUBBER INDUSTRIES, LTD., Kobe (JP)

(72) Inventors: Hidetaka Inoue, Kobe (JP); Toshiyuki Tarao, Kobe (JP); Kuniyasu Horiuchi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,934

(22) Filed: Jun. 7, 2019

(65) Prior Publication Data

US 2019/0282859 A1 Sep. 19, 2019

Related U.S. Application Data

(63) Continuation of application No. 15/592,835, filed on May 11, 2017, now Pat. No. 10,357,690.

(30) Foreign Application Priority Data

May 25, 2016 (JP) .............................. JP2016-104568

(51) Int. Cl.
| | |
|---|---|
| *A63B 37/00* | (2006.01) |
| *C08G 83/00* | (2006.01) |
| *C08G 18/79* | (2006.01) |
| *C08G 18/24* | (2006.01) |
| *C09D 175/06* | (2006.01) |
| *C08G 18/42* | (2006.01) |
| *C08L 5/16* | (2006.01) |
| *C08B 37/16* | (2006.01) |
| *C09D 131/04* | (2006.01) |
| *C09D 175/08* | (2006.01) |

(52) U.S. Cl.
CPC ...... *A63B 37/0022* (2013.01); *A63B 37/0077* (2013.01); *C08B 37/0015* (2013.01); *C08G 18/246* (2013.01); *C08G 18/4202* (2013.01); *C08G 18/4277* (2013.01); *C08G 18/792* (2013.01); *C08G 83/007* (2013.01); *C08L 5/16* (2013.01); *C09D 131/04* (2013.01); *C09D 175/06* (2013.01); *C09D 175/08* (2013.01)

(58) Field of Classification Search
None
See application file for complete search history.

(56) References Cited

U.S. PATENT DOCUMENTS

| | | | |
|---|---|---|---|
| 6,454,667 | B1 | 9/2002 | Iwami |
| 9,656,126 | B2 | 5/2017 | Inoue et al. |
| 10,238,920 | B2 * | 3/2019 | Inoue ................. C08G 18/4887 |
| 10,357,690 | B2 * | 7/2019 | Inoue ................. C08G 18/4277 |
| 10,806,969 | B2 * | 10/2020 | Inoue .................. C09D 175/08 |
| 2003/0083158 | A1 | 5/2003 | Ishino |
| 2003/0176242 | A1 | 9/2003 | Mano |
| 2009/0281213 | A1 | 11/2009 | Ito et al. |
| 2011/0053708 | A1 | 3/2011 | Isoagawa et al. |
| 2011/0244989 | A1 | 10/2011 | Tarao et al. |
| 2013/0252763 | A1 | 9/2013 | Isogawa et al. |
| 2016/0136484 | A1 | 5/2016 | Inoue et al. |

FOREIGN PATENT DOCUMENTS

| | | |
|---|---|---|
| JP | 2000-288125 A | 10/2000 |
| JP | 2003-265650 A | 9/2003 |
| JP | 2006-75209 A | 3/2006 |
| JP | 2006-75210 A | 3/2006 |
| JP | 2011-67595 A | 4/2011 |
| JP | 2011-217820 A | 11/2011 |
| JP | 2014-14385 A | 1/2014 |

OTHER PUBLICATIONS

Advanced Softmaterials SeRM Super Polymer User's Guide, (2011) pp. 1-4.

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball showing improved controllability on approach shots for less than 40 yards, in particular, on approach shots around the green (about 10 yards to 20 yards) and improved controllability on approach shots from the rough, and showing excellent shot feeling. The present invention provides a golf ball comprising a golf ball body and a paint film covering the golf ball body, wherein a loss tangent tan δ has a peak temperature of 50° C. or less and a peak height of less than 0.8, obtained by measuring dynamic viscoelasticity of the paint film under the following conditions:
<Measuring Conditions>
Measuring mode: tensile mode
Measuring temperature range: from −100° C. to 150° C.
Temperature rising rate: 4° C./min
Oscillation frequency: 10 Hz
Measuring strain: 0.1.

18 Claims, 11 Drawing Sheets

(a)

(b)

GOLF BALL

CROSS-REFERENCE TO RELATED APPLICATIONS

This application is a Continuation of copending U.S. application Ser. No. 15/592,835, filed on May 11, 2017 (now U.S. Pat. No. 10,357,690, issued on Jul. 23, 2019), which claims priority under 35 U.S.C. § 119(a) to Application No. 2016-104568, filed in Japan on May 25, 2016, all of which are hereby expressly incorporated by reference into the present application.

FIELD OF THE INVENTION

The present invention relates to a technology for improving spin performance of a golf ball.

DESCRIPTION OF THE RELATED ART

A paint film is formed on a surface of a golf ball body. Improvement of a golf ball performance by improving the paint film has been proposed.

Japanese Patent Publication No. 2011-67595 A discloses a golf ball comprising a core, a cover situated on the external side of the core, and a paint layer situated on the external side of the cover, wherein the cover has a Shore D hardness of 61 or less, and the paint layer has a Martens hardness of 2.0 mgf/μm² or less. The golf ball is excellent in spin performance, spin rate stability and paint layer durability.

Japanese Patent Publication No. 2011-217820 A discloses a golf ball comprising a golf ball body and a paint film formed on a surface of the golf ball body, wherein the paint film has a Martens hardness of 2.0 mgf/μm² or less, and a ratio (50% elastic modulus/10% elastic modulus) of a 50% elastic modulus to a 10% elastic modulus of 1.6 or more. The golf ball has a high spin rate on approach shots under a wet condition and rough condition.

Japanese Patent Publications No. 2006-75209 A and No. 2006-75210 A have proposed a golf ball stopping quickly with an increased launch angle. Japanese Patent Publication No. 2006-75209 A discloses a golf ball comprising a golf ball body and a paint film covering a surface of the golf ball body, wherein a resin component constituting the paint film is cured by a polyamide based curing agent, and the golf ball has a static coefficient of friction of 0.22 or less. Japanese Patent Publication No. 2006-75210 A discloses a golf ball comprising a golf ball body and a paint film covering the golf ball body, wherein the paint film contains metal particles.

Japanese Patent Publication No. 2000-288125 A has proposed a golf ball showing improved durability and abrasion resistance. The golf ball showing excellent durability comprises a core, a cover and at least one paint layer formed on the cover, wherein the cover has a Shore D hardness ranging from 50 to 65 and a bending flexural modulus ranging from 1,000 to 2,000 kgf/cm², and at least an outermost layer of the paint has a 10% modulus of from 5 to 50 kgf/cm².

Japanese Patent Publication No. 2003-265650 A has proposed a golf ball showing improved spin retention ratio without sacrificing the required properties for the paint film. The golf ball comprises a core, at least one cover layer covering the core and a paint film formed on an outer surface of the cover, wherein the paint film has a thickness falling within a range of 25 μm or more and 125 μm or less and a 50% modulus falling within a range of 5 MPa or more and 50 MPa or less, and R expressed by a following equation (1) falls within a range of 0.01 or more and 0.5 or less, when CL (mm) represents a thickness of an outermost layer of the cover, and PL (μm) represents the thickness of the paint film;

$$R = PL/CL/1{,}000 \qquad (1).$$

Japanese Patent Publication No. 2014-14385 A has proposed a golf ball showing high controllability on approach shots for less than 40 yards, a lowered spin rate on driver shots, and an excellent shot feeling. The golf ball disclosed in Japanese Patent Publication No. 2014-14385 A comprises a golf ball body and a paint film formed on a surface of the golf ball body, wherein the paint film has a storage modulus (E') of $1.00 \times 10^7$ dyn/cm² or more and $1.00 \times 10^8$ dyn/cm² or less in a temperature range from 120° C. to 150° C., and a loss tangent (tan δ) of 0.050 or more at 10° C., when measured using a dynamic viscoelasticity measuring apparatus under the following conditions:

<Measuring Conditions>
Measuring mode: tensile mode
Measuring temperature: from −50° C. to 150° C.
Temperature rising rate: 4° C./min
Oscillation frequency: 10 Hz
Measuring strain: 0.1%.

SUMMARY OF THE INVENTION

Japanese Patent Publication No. 2014-14385 A has proposed a golf ball showing high controllability on approach shots for less than 40 yards, in particular, on approach shots around the green for about 10 yards to about 20 yards. However, further improvement for the controllability on approach shots for less than 40 yards, in particular, on approach shots around the green is desirable.

The present invention has been made in view of the above-described situation, and an object of the present invention is to provide a golf ball showing improved controllability on approach shots for less than 40 yards, in particular, on approach shots around the green (about 10 yards to 20 yards) and improved controllability on approach shots from the rough, and showing excellent shot feeling.

The present invention provides a golf ball comprising a golf ball body and a paint film covering the golf ball body, wherein a loss tangent tan δ has a peak temperature of 50° C. or less and a peak height of less than 0.8, obtained by measuring dynamic viscoelasticity of the paint film under the following conditions:

<Measuring Conditions>
Measuring mode: tensile mode
Measuring temperature range: from −100° C. to 150° C.
Temperature rising rate: 4° C./min
Oscillation frequency: 10 Hz
Measuring strain: 0.1%.

According to the present invention, a golf ball showing improved controllability on approach shots for less than 40 yards, in particular, on approach shots around the green (about 10 yards to 20 yards) and improved controllability on approach shots from the rough, and showing excellent shot feeling, is obtained.

DESCRIPTION OF THE PREFERRED EMBODIMENT

Figure 1:
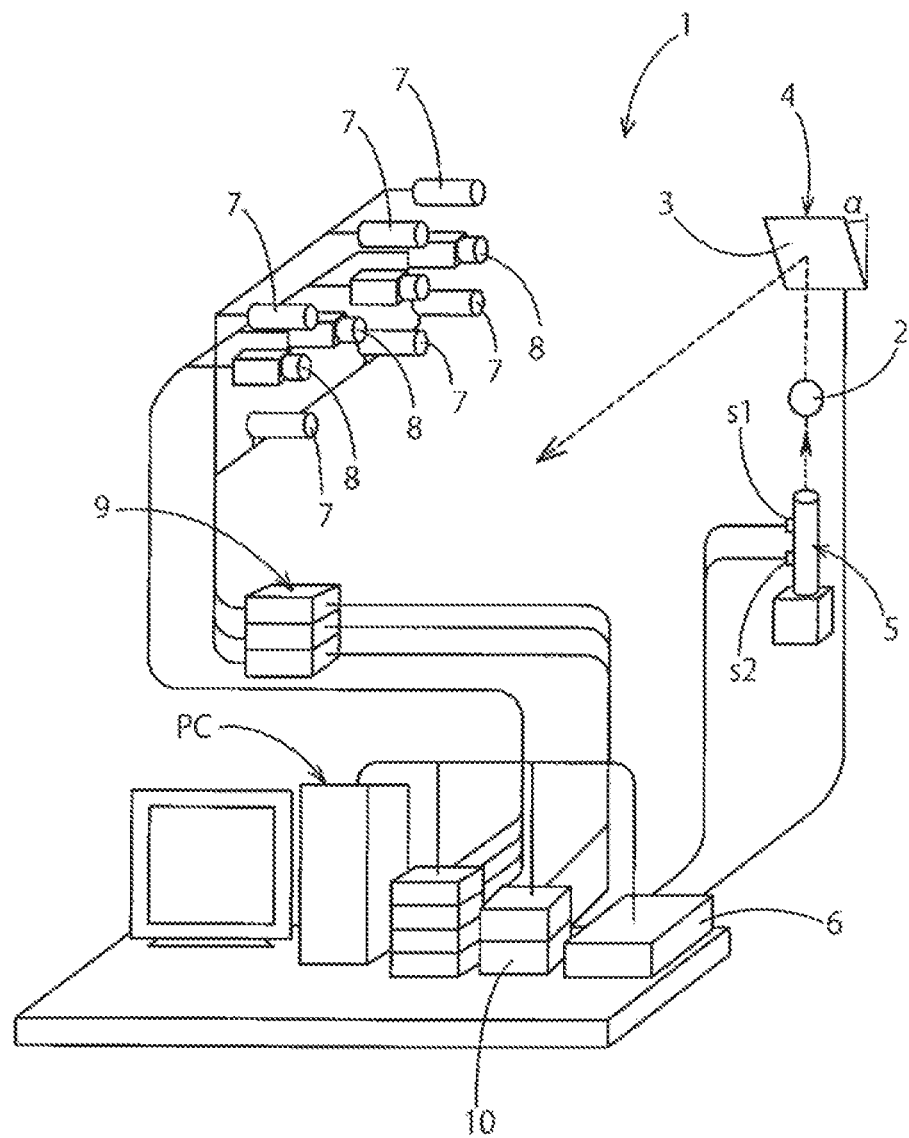
FIG. 1 is a schematic view of an example of a contact force tester used in the present invention.

The present invention provides a golf ball comprising a golf ball body and a paint film covering the golf ball body, wherein a loss tangent tan δ has a peak temperature of 50° C. or less and a peak height of less than 0.8, obtained by measuring dynamic viscoelasticity of the paint film under the following conditions: <Measuring Conditions>

Measuring mode: tensile mode
Measuring temperature range: from −100° C. to 150° C.
Temperature rising rate: 4° C./min
Oscillation frequency: 10 Hz
Measuring strain: 0.1%.

The peak temperature of the loss tangent tan δ is 50° C. or less, and is preferably 45° C. or less, more preferably 40° C. or less, and is preferably −40° C. or more, more preferably −35° C. or more, even more preferably −30° C. or more. If the peak temperature of the loss tangent (tan δ) falls within the above range, viscosity becomes predominant on approach shots, and thus the shot feeling is good.

The peak height of the loss tangent tan δ, obtained by measuring the dynamic viscoelasticity of the paint film of the golf ball according to the present invention, is less than 0.8, and is preferably 0.79 or less, more preferably 0.78 or less. If the peak height of the loss tangent (tan δ) is less than 0.8, energy transmission efficiency is high and thus shearing stress is great, as a result, the spin performance is improved. The peak height of the loss tangent tan δ is preferably 0.6 or more, more preferably 0.61 or more, and even more preferably 0.62 or more. If the paint film in which the peak height of the loss tangent (tan δ) is 0.6 or more, is used, a lower launch angle and a higher spin rate on approach shots for less than 40 yards can be achieved.

The storage modulus (E') of the paint film at 23° C., obtained by measuring the dynamic viscoelasticity of the paint film, is preferably $1.0 \times 10^9$ dyn/cm$^2$ or less, more preferably $7.0 \times 10^8$ dyn/cm$^2$ or less, and even more preferably $5.0 \times 10^8$ dyn/cm$^2$ or less. The paint film having the storage modulus (E') of $1.0 \times 10^9$ dyn/cm$^2$ or less at 23° C. further increases the spin rate on approach shots for less than 40 yards. As a result, the golf ball according to the present invention has further enhanced controllability on approach shots for less than 40 yards. On the other hand, in view of the reason that tackiness will be left if the storage modulus is excessively low, the storage modulus (E') of the paint film at 23° C. is preferably $5.0 \times 10^6$ dyn/cm$^2$ or more, more preferably $7.0 \times 10^6$ dyn/cm$^2$ or more, and even more preferably $9.0 \times 10^6$ dyn/cm$^2$ or more.

The loss modulus (E") of the paint film at 23° C., obtained by measuring the dynamic viscoelasticity of the paint film, is preferably $1.0 \times 10^6$ dyn/cm$^2$ or more, more preferably $2.0 \times 10^5$ dyn/cm$^2$ or more, even more preferably $3.0 \times 10^5$ dyn/cm$^2$ or more, and is preferably $6.0 \times 10^7$ dyn/cm$^2$ or less, more preferably $5.0 \times 10^7$ dyn/cm$^2$ or less, even more preferably $4.0 \times 10^7$ dyn/cm$^2$ or less. If the loss modulus (E") of the paint film at 23° C. falls within the above range, viscosity is appropriate and thus tackiness is moderate and energy transmission efficiency is high, as a result, the performance on approach shots is better.

The 10% modulus of elasticity of the paint film covering the golf ball body according to the present invention is preferably 130 kgf/cm$^2$ or less, more preferably 120 kgf/cm$^2$ or less, and even more preferably 110 kgf/cm$^2$ or less. If the 10% modulus of elasticity of the paint film is 130 kgf/cm$^2$ or less, the paint film is soft, and the spin rate on approach shots is increased. The lower limit of the 10% modulus of elasticity of the paint film is not particularly limited, and is preferably 2 kgf/cm$^2$, more preferably 4 kgf/cm$^2$. If the 10% modulus of elasticity of the paint film is excessively low, the paint film becomes so soft that tackiness is left and feeling becomes worse.

The dynamic viscoelasticity and the 10% modulus of elasticity of the paint film are obtained by preparing a measuring film from the paint composition for forming the paint film under the predetermined conditions, and measuring the dynamic viscoelasticity and the 10% modulus of elasticity of the measuring film. The method of preparing the measuring film and the measuring method will be described later.

The golf ball according to the present invention comprises a golf ball body and a paint film covering the golf ball body, and the paint film thereof preferably has a coefficient of friction of 0.48 or more, calculated using a contact force tester.

In the present invention, the coefficient of friction calculated using the contact force tester is a coefficient of friction between the golf ball and a collision plate when the golf ball is allowed to collide with the collision plate disposed inclined at a predetermined angle to the flying direction of the golf ball. By using the contact force tester, a time function Fn(t) of contact force in a direction perpendicular to the collision plate and a time function Ft(t) of contact force in a direction parallel to the collision plate are concurrently measured, and a maximum value of a time function M(t) which is a ratio of Ft(t) to Fn(t) represented by the following equation is defined as a coefficient of friction.

$$M(t)=Ft(t)/Fn(t)$$

Figure 2:
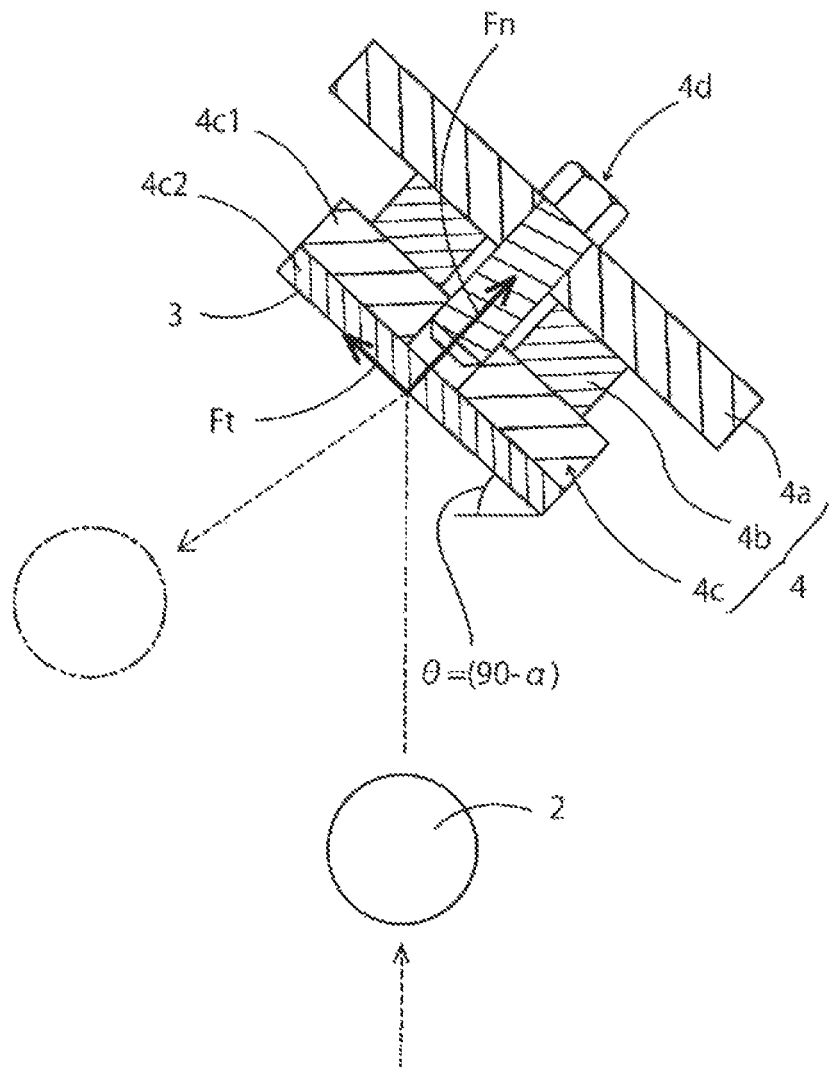
FIG. 2 is a partially enlarged cross-sectional view of a collision plate of the contact force tester.

In the present invention, the method of calculating the coefficient of friction will be described based on FIG. 1 to FIG. 3. FIG. 1 is a contact force tester for measuring the coefficient of friction. FIG. 2 is an enlarged cross-sectional view of a collision plate 4 that the golf ball is allowed to collide with.

The contact force tester 1 makes pseudo conditions of hitting a golf ball with a club face, and enables to measure various forces at that time. The contact force tester 1 includes, for example, a launcher 5 launching a golf ball 2 in an upward and perpendicular direction, and a collision plate 4 positioning on the upper side of the launched golf ball 2 and having a striking face 3 that the golf ball 2 collides with.

Since a distance between the launcher 5 and the striking face 3 is relatively short, an initial velocity of the golf ball 2 corresponds to a collision velocity. This collision velocity corresponds to a head speed of a club head in an actual golf swing. In view of this point, the collision velocity of the golf ball 2 to the striking face 3 may be set, for example, within the range of about 10 m/sec to about 50 m/sec. In the present invention, in light of the head speed of approach shots, the initial velocity is set to 19 m/sec.

The desired value of the initial velocity of the golf ball 2 is set by the volume of a controller 6 or the like. Based on a distance between a first sensor S1 and a second sensor S2 provided in the launcher 5 and a time difference between passing through these sensors, the controller 6 calculates the actually measured value of the initial velocity of the golf ball 2, and outputs the value to a computer device PC or the like.

FIG. 2 shows a partially enlarged cross-sectional view of the collision plate 4. The collision plate 4 can incline the striking face 3 at a predetermined angle α to the launching direction (flying direction) of the golf ball 2. In the present invention, an angle θ obtained by subtracting the angle α from 90 degree is defined as a collision angle. This collision angle θ corresponds to a loft angle of a club face (not shown) in an actual swing. Further, in view of the loft angle of a golf club, the collision angle θ is set to a plurality of values (e.g. 15°, 20°, 35° and the like), for example, within a range from 10° to 90°, and the measurement of the contact force, which will be described later, can be conducted at each angle. In the present invention, the collision angle θ is set to 55° in order to recreate the spin rate on approach shots.

The collision plate 4 comprises, for example, a base plate 4a formed from a metal plate material, a superficial plate 4c constituting the striking face 3, and a pressure sensor 4b interposed therebetween, which are fixed to one another with a bolt 4d integrally.

The base plate 4a may be formed from any material without particular limitation, as long as it has a predetermined strength and rigidity, but preferably formed from steel. The base plate 4a preferably has a thickness in a range from 5.0 mm to 20.0 mm. A model number of the main bolt 4d is, for example, M10 according to JIS.

As the pressure sensor 4b, for example, a 3-component force sensor is preferably used. Such sensor can measure, at least, a perpendicular force Fn in a direction perpendicular to the striking face 3, and a shear force Ft in a direction parallel to the striking face 3 (a direction from the sole side toward the crown side in a club face) as time-series data. The measurement of the force is conducted by connecting a charge amplifier or the like to the pressure sensor 4b.

As the pressure sensor 4b, a variety of products may be used, for example, a 3-component force sensor (model 9067) available from Kistler Instrument Corporation can be used. This sensor enables to measure force components in a parallel direction, a Y direction and a perpendicular direction. Although not illustrated, the measurement of the pressure is conducted by connecting a charge amplifier (model 5011B available from Kistler Instrument Corporation) to the pressure sensor 4b. The pressure sensor 4b is formed in its center with a through-hole through which the main bolt 4d is inserted to integrally fix the pressure sensor 4b to the base plate 4a.

The superficial plate 4c is composed of a main body 4c1 and a superficial material 4c2 disposed outside of the main body 4c1 to provide the striking face 3 and having an area large enough to collide with the golf ball 2. These are fixed with a bolt or the like, which is not illustrated, in a detachable manner. Accordingly, by appropriately changing the material, planner shape and/or surface structure of the superficial material 4c2, it is possible to create approximate models of various kinds of club faces and to measure the contact force thereof.

The main body 4c1 may be formed from any material without limitation, but typically formed from stainless steel (SUS-630). The thickness of the main body 4c1 is typically in a range from 10 mm to 20 mm. Further, the main body 4c1 may have a substantially same planner shape as the pressure sensor 4b, for example, a square shape with a length of 40 mm to 60 mm on one side. Into the main body 4c1, the front end of the main bolt 4d is screwed. As a result, the pressure sensor 4b is interposed between the base plate 4a and the main body 4c1, and the position thereof is fixed.

The superficial material 4c2 providing the striking face 3 of the collision plate 4 may adopt various materials, planner shapes and surface structures, however, it is preferably formed from the same material as the face (not shown) of the golf club head which has been set as an analysis subject beforehand. In the present invention, in view of evaluating a model of approach shots, SUS-431 stainless steel which is the same material as the head material of CG-15 available from Cleveland Golf is used as the superficial material 4c2. The thickness of the superficial material 4c2 may be arbitrarily changed, for example, within a range of 1.0 mm to 5.0 mm. The planner shape of the superficial material 4c2 may be substantially the same as that of the main body 4c1, for example, a square shape with a length of 40 mm to 60 mm on one side.

The contact force tester 1 comprises a strobe device 7 and a high speed type camera device 8 enabling to take a photograph of the collision between the golf ball 2 and the striking face 3 as well as the golf ball 2 rebounding from the striking face 3. The strobe device 7 is connected to a strobe power 9. The camera device 8 is connected to a camera power 10 via a capacitor box. The imaged data is memorized in the computer device PC or the like. By comprising these devices, a slipping velocity and a contact area at the time of the collision between the golf ball 2 and the striking face 3, and a launch speed, a launch angle and a backspin rate of a golf ball, which will be explained later, can be measured.

Figure 3:
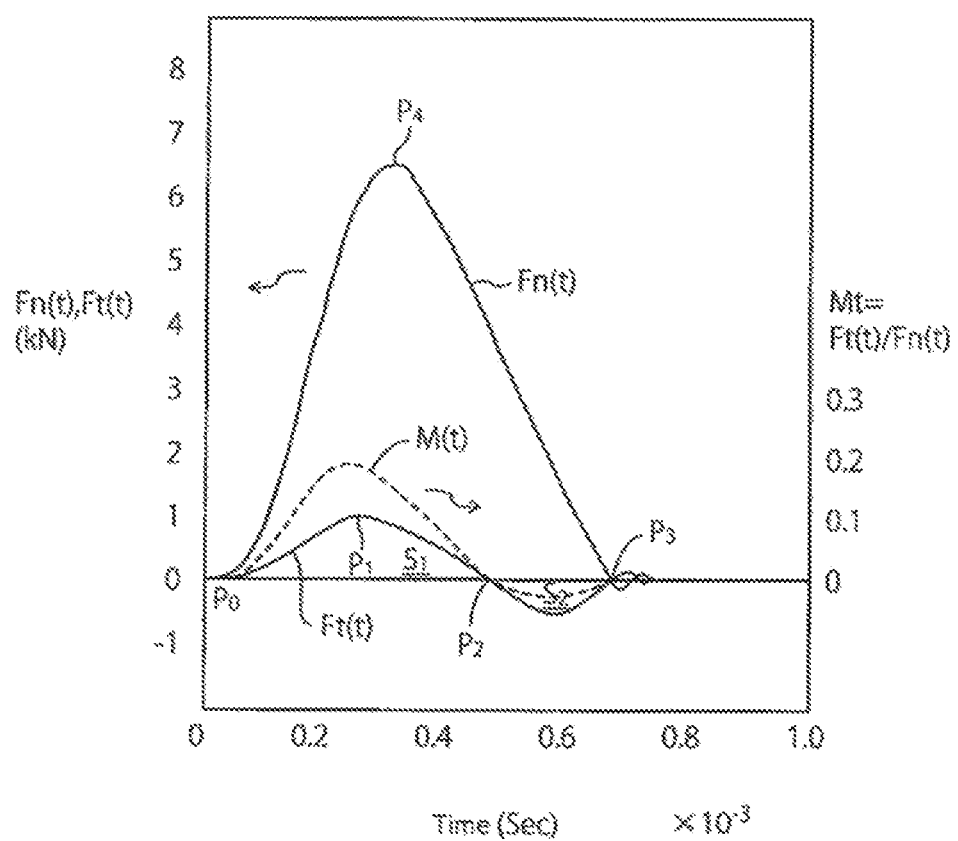
FIG. 3 is a graph illustrating an example of Ft(t), Fn(t) and M(t)

FIG. 3 shows a time history of the perpendicular force Fn and the shear force Ft applied to the striking face 3 at the time of the collision by the golf ball 2 measured with the contact force tester 1 under a specific condition.

FIG. 3 is a graph illustrating an example of Fn(t) and Ft(t) measured with the tester shown in FIGS. 1 and 2. In FIG. 3, a point P0 represents a point where the pressure sensor 4b starts sensing force, and generally corresponds to the point at which the striking face 3 and the golf ball 2 come into collision with each other. Fn(t) which is a contact force in the perpendicular direction gradually increases from the point P0, peaks at a point P4, and comes down therefrom to reach zero at a point P3. The point P3 represents a point where the pressure sensor 4b no longer senses force, and generally corresponds to the point where the golf ball 2 leaves the striking face 3.

On the other hand, the value of Ft(t) which is a contact force (i.e., shear force) in the direction parallel to the collision plate increases with time from the point P0, peaks at a point P1, and comes down therefrom to reach zero at a point P2 after which it takes a negative value. Since the golf ball leaves the pressure sensor 4b at the point P3, the curve of Ft(t) sensed by the pressure sensor 4b takes zero at the point P3. An area S1 of the region where Ft(t) takes a positive value within the region surrounded by the curve of Ft(t) and the time axis represents impulse where the shear force is positive. On the other hand, an area S2 of the region where Ft(t) takes a negative value within the region surrounded by the curve of Ft(t) and the time axis represents impulse where the shear force is negative. Impulse S1 acts in a direction promoting back spin, and impulse S2 acts in a direction inhibiting back spin. Here, impulse S1 takes a larger value than impulse S2, and a value obtained by subtracting impulse S2 from impulse S1 contributes to back spin of a golf ball.

A coefficient of friction can be obtained by calculating a maximum value of M(t) which is expressed by Ft(t)/Fn(t).

In the present invention, the coefficient of friction (dry) obtained as described above is preferably 0.48 or more, more preferably 0.49 or more, even more preferably 0.50 or more, and is preferably 0.60 or less, more preferably 0.58 or less, even more preferably 0.56 or less. If the coefficient of friction falls within the above range, the spin rate on approach shots becomes better.

Further, in the present invention, when measuring the coefficient of friction as described above, a wet paper having slits formed thereon is attached on the surface of the collision plate, and the measured wet paper slit coefficient of friction is preferably 0.18 or more, and more preferably 0.19 or more. In addition, the upper limit of the wet paper slit coefficient of friction is not particularly limited, but is preferably 0.35. The wet paper slit coefficient of friction measured by attaching the wet paper can be used to evaluate controllability on approach shots from the rough. If the wet paper slit coefficient of friction falls within the above range, the golf ball according to the present invention is also excellent in controllability on approach shots from the rough.

The resin component of the paint film of the golf ball according to the present invention preferably contains a polyurethane, wherein the polyurethane comprises, as a constituent component, (A) a polyisocyanate component and (B) a polyol component containing a polyrotaxane.

As (A) the polyisocyanate component, for example, a compound having at least two isocyanate groups can be exemplified. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI), and derivates of these polyisocyanates. In the present invention, as the polyisocyanate, two or more of them may be used.

Examples of the derivative of the polyisocyanate include an isocyanurate of diisocyanate; an adduct obtained through a reaction between a diisocyanate and a low molecular weight triol such as trimethylolpropane or glycerin; an allophanate-modified product; and a biuret-modified product. It is preferable that a free diisocyanate is removed from the derivative of the polyisocyanate. The allophanate-modified product is, for example, a trifunctional polyisocyanate obtained by further reacting a diisocyanate with a urethane bond formed through a reaction between a diisocyanate and a low molecular weight diol. The biuret-modified products is, for example, a trifunctional polyisocyanate having a biuret bond and represented by the following formula (1). The isocyanurate of diisocyanate is, for example, a trifunctional polyisocyanate represented by the following formula (2).

It is noted that in the formulae (1) and (2), R represents a residue where the isocyanate group is removed from the diisocyanate.

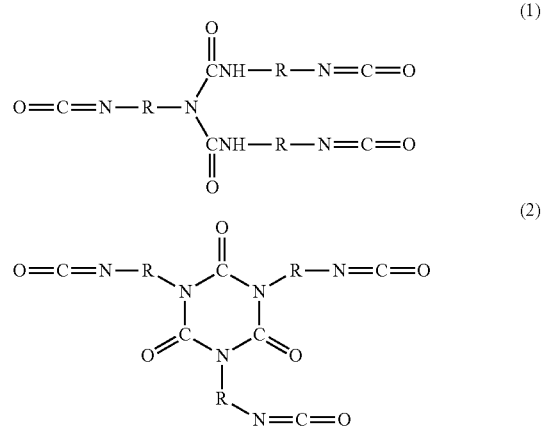

In the present invention, as the polyisocyanate, the isocyanurate is preferably used, and the isocyanurate of hexamethylene diisocyanate is more preferably used.

The content (NCO %) of the isocyanate group in the polyisocyanate is preferably 0.5 mass % or more, more preferably 1 mass % or more, even more preferably 2 mass % or more, and is preferably 45 mass % or less, more preferably 40 mass % or less, even more preferably 35 mass % or less. It is noted that the content (NCO %) of the isocyanate group in the polyisocyanate can be represented by 100×[mole number of isocyanate group in polyisocyanate×42 (molecular weight of NCO)]/[total mass (g) of polyisocyanate].

Specific examples of the polyisocyanate include Burnock D-800, Burnock DN-950, and Burnock DN-955 available from DIC corporation; Desmodur N75MPA/X, Desmodur N3300, Desmodur N3390, Desmodur L75 (C), and Sumidur E21-1 available from Sumika Bayer Urethane Co., Ltd; Coronate HX, and Coronate HK available from Nippon Polyurethane Industry Co., Ltd; Duranate 24A-100, Duranate 21S-75E, Duranate TPA-100, and Duranate TKA-100 available from Asahi Kasei Chemicals Corporation; and VESTANAT T1890 available from Degussa Co., Ltd.

Next, (B) the polyol component containing the polyrotaxane will be explained. The polyrotaxane has a cyclodextrin, a linear molecule piercing through the cyclic structure of the cyclodextrin, and blocking groups located at both terminals of the linear molecule to prevent disassociation of the cyclodextrin. The polyrotaxane is viscoelastic, since the cyclodextrin molecule is movable along the linear molecule that pierces through the cyclodextrin in a skewering manner (pulley effect). Even if a tension is applied to the polyrotaxane, the tension can be uniformly dispersed due to the pulley effect. It is noted that, in the present invention, (B) the polyol component is not particularly limited, as long as it has a plurality of hydroxyl groups. The polyrotaxane is a polyol component, since a plurality of hydroxyl groups which may react with an isocyanate group, exist on the cyclodextrin cyclic structure thereof.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. As the cyclodextrin, one type may be used solely, and two or more types may be used in combination.

The linear molecule is preferably a linear molecule capable of piercing through the cyclic structure of the cyclodextrin so that the cyclic structure of the cyclodextrin is rotatable around the linear molecule. Examples of the linear molecule include polyalkylene, polyester, polyether, and polyacrylic acid. Among them, polyether is preferable, polyethylene glycol is particularly preferable. Polyethylene glycol has less steric hindrance, and thus can easily pierce through the cyclic structure of the cyclodextrin.

The weight average molecular weight of the linear molecule is preferably 5,000 or more, more preferably 6,000 or more, and is preferably 100,000 or less, more preferably 80,000 or less.

The linear molecule preferably has a functional group at both terminals thereof. When the linear molecule has the functional group, the linear molecule can easily react with the blocking group. Examples of the functional group include a hydroxyl group, carboxyl group, amino group, and thiol group.

The blocking group is not particularly limited, as long as it is located at both terminals of the linear molecule to prevent the cyclodextrin from disassociating from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrins which the linear molecule pierces through preferably ranges from 0.06 to 0.61, more preferably ranges from 0.11 to 0.48, even more preferably ranges from 0.24 to 0.41, if the maximum number of the cyclodextrins which the linear molecule pierces through is deemed as 1. This is because if the number of the cyclodextrins is less than 0.06, the pulley effect may not be exerted, and if the number of the cyclodextrins exceeds 0.61, the cyclodextrins are very densely located, so that the movability of the cyclodextrin may decrease.

The polyrotaxane used in the present invention is a polyrotaxane having at least a part of hydroxyl groups of the cyclodextrin being modified with a caprolactone chain. Modifying with the caprolactone chain enhances the compatibility of the polyrotaxane with the polyurethane. Further, modifying with the caprolactone chain enhances the flexibility of the polyrotaxane, thereby enhancing the spin performance of the golf ball on approach shots.

As the above modification, for example, the hydroxyl groups of the cyclodextrin are treated with propylene oxide to hydroxylpropylate the cyclodextrin, and then ε-caprolactone is added to perform ring-opening polymerization. As a result of this modification, the caprolactone chain $-(CO(CH_2)_5O)nH$ (n is a natural number ranging from 1 to 100) is linked to the exterior side of the cyclic structure of the cyclodextrin via $-O-C_3H_6-O-$ group. The above "n" represents the degree of polymerization, and is preferably a natural number ranging from 1 to 100, more preferably a natural number ranging from 2 to 70, even more preferably a natural number ranging from 3 to 40. At the other end of the caprolactone chain, a hydroxyl group is formed through the ring-opening polymerization.

The ratio of the hydroxyl groups modified with the caprolactone chain to all the hydroxyl groups (100 mole %) included in the cyclodextrin before the modification is preferably 2 mole % or more, more preferably 5 mole % or more, even more preferably 10 mole % or more. If the ratio of the hydroxyl groups modified with the caprolactone chain falls within the above range, the flexibility of the polyrotaxane is greater, and thus the spin performance of the golf ball under a wet condition is further enhanced.

Figure 7:
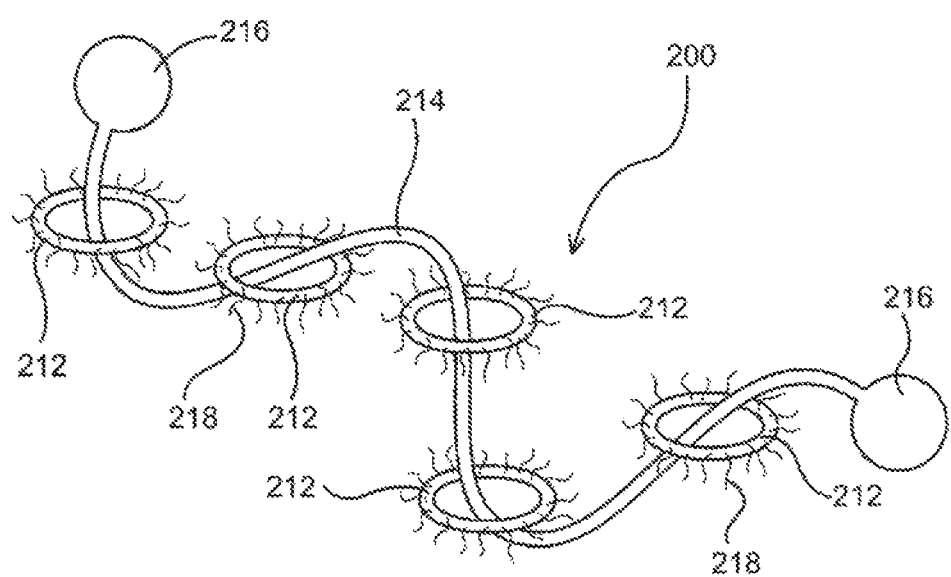
FIG. 7 is an explanatory drawing illustrating a molecular structure of an example of a polyrotaxane used in the present invention.

FIG. 7 is a figure illustrating a molecular structure of one example of the polyrotaxane used in the present invention. A polyrotaxane 200 has a cyclodextrin 212, a linear molecule 214 piercing through the cyclic structure of the cyclodextrin 212, and blocking groups 216 located at both terminals of the linear molecule 214 to prevent disassociation of the cyclodextrin 212, and a caprolactone chain 218 is linked to the exterior side of the cyclic structure of the cyclodextrin 212 via $-O-C_3H_6-O-$ group (not shown).

The hydroxyl value of the polyrotaxane is preferably 10 mg KOH/g or more, more preferably 15 mg KOH/g or more, even more preferably 20 mg KOH/g or more, and is preferably 400 mg KOH/g or less, more preferably 300 mg KOH/g or less, even more preferably 220 mg KOH/g or less, particularly preferably 180 mg KOH/g or less. If the hydroxyl value of the polyrotaxane falls within the above range, the reactivity of the polyrotaxane with (A) the polyisocyanate component is further increased, and the resultant paint film has better durability. It is noted that the hydroxyl value may be measured according to JIS K 1557-1, for example, by an acetylation method.

The total molecular weight of the polyrotaxane is preferably 30,000 or more, more preferably 40,000 or more, even more preferably 50,000 or more, and is preferably 3,000,000 or less, more preferably 2,500,000 or less, even more preferably 2,000,000 or less, in a weight average molecular weight. If the total weight average molecular weight is 30,000 or more, the resultant paint film has greater strength, and if the total weight average molecular weight is 3,000,000 or less, the resultant paint film has greater flexibility and thus the spin performance of the golf ball on approach shots is further enhanced. It is noted that the total weight average molecular weight may be measured, for example, by gel permeation chromatography (GPC) using polystyrene as a standard substance, tetrahydrofuran as an eluant, and an organic solvent system GPC column (e.g., "Shodex (registered trademark) KF series" available from Showa Denko K.K.) as a column.

Specific examples of the polyrotaxane modified with the polycaprolactone chain include SeRM (registered trademark) super polymer SH3400P, SH2400P, and SH1310P available from Advanced Softmaterials Inc.

(B) The polyol component may further contain other polyol component. The other polyol component is not particularly limited, as long as it has a plurality of hydroxyl groups, and examples thereof include a low molecular weight polyol and a high molecular weight polyol.

Examples of the low molecular weight polyol include a diol such as ethylene glycol, diethylene glycol, triethylene glycol, propanediol (e.g. 1,2-propanediol, 1,3-propanediol, 2-methyl-1,3-propanediol, and the like), dipropylene glycol, butanediol (e.g. 1,2-butanediol, 1,3-butanediol, 1,4-butanediol, 2,3-butanediol, 2,3-dimethyl-2,3-butanediol, and the like), neopentyl glycol, pentanediol, hexanediol, heptanediol, octanediol, 1,4-cyclohexanedimethylol, aniline diol, and bisphenol A type diol; a triol such as glycerin, trimethylolpropane, and hexanetriol, and a tetraol or a hexol such as pentaerythritol and sorbitol.

Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol.

The number average molecular weight of the high molecular weight polyol, for example, is preferably 400 or more, and more preferably 1,000 or more, without particular limitation. The upper limit of the number average molecular weight of the high molecular weight polyol is preferably 10,000, more preferably 8,000, without particular limitation. If the number average molecular weight of the high molecular weight polyol falls within the above range, the resultant paint film has better adhesion with the golf ball body. It is noted that the number average molecular weight may be measured by gel permeation chromatography (GPC), using polystyrene as a standard material, tetrahydrofuran as an eluate, and two of TSK-GEL SUPERH2500 (available from Tosoh Corporation) as a column.

In one preferable embodiment of the present invention, (B) the polyol component further contains at least one selected from the group consisting of a polyether polyol, a polyester polyol, a polycaprolactone polyol, a polycarbonate polyol, and an acrylic polyol, in addition to the polyrotaxane.

In one more preferable embodiment of the present invention, (B) the polyol component further contains a polycaprolactone polyol (poly-ε-caprolactone (PCL)), in addition to the polyrotaxane. Specific examples of the polycaprolactone polyol include Placcel 308, Placcel 312 available from Daicel Corporation, and Capa 4101, Capa 4801 available from Perstorp Inc.

Examples of (B) the polyol component include an embodiment where (B) the polyol component consists of the polyrotaxane; an embodiment where (B) the polyol component consists of the polyrotaxane and the high molecular weight polyol; an embodiment where (B) the polyol component consists of the polyrotaxane and the low molecular weight polyol; and an embodiment where (B) the polyol component consists of the polyrotaxane, the high molecular weight polyol and the low molecular weight polyol. It is noted that the low molecular weight polyol and the high molecular weight polyol may be used solely or as a mixture of at least two of them.

In the case that (B) the polyol component contains the polyrotaxane and the other polyol, the amount of the polyrotaxane in (B) the polyol component is preferably 10 mass % or more, more preferably 15 mass % or more, and even more preferably 20 mass % or more. In addition, the amount of the polyrotaxane in (B) the polyol component is preferably 100 mass % or less, more preferably 90 mass % or less, and even more preferably 80 mass % or less. If the amount of the polyrotaxane falls within the above range, the flexibility which is a property of the polyrotaxane, is fully exerted.

The polyurethane used in the present invention may further comprise a polyamine as a constituent component, in addition to (A) the polyisocyanate component and (B) the polyol component. The polyamine is not particularly limited, as long as it has at least two amine groups. Examples of the polyamine include an aliphatic polyamine, an alicyclic polyamine, and an aromatic polyamine. Examples of the aliphatic polyamine include ethylenediamine, propylenediamine, butylenediamine, and hexamethylenediamine. Examples of the alicyclic polyamine include isophoronediamine and piperazine.

The aromatic polyamine is not particularly limited, as long as it has at least two amino groups directly or indirectly bonded to an aromatic ring. Herein, the "indirectly bonded to an aromatic ring" means that the amino group is bonded to an aromatic ring via, for example, a lower alkylene group. The aromatic polyamine may be, for example, a monocyclic aromatic polyamine having at least two amino groups bonded to one aromatic ring, or a polycyclic aromatic polyamine having at least two aminophenyl groups each having at least one amino group bonded to one aromatic ring.

Examples of the monocyclic aromatic polyamine include a type wherein amino groups are directly bonded to an aromatic ring, such as phenylenediamine, tolylenediamine, diethyltoluenediamine, and dimethylthiotoluenediamine; and a type wherein amino groups are bonded to an aromatic ring via a lower alkylene group, such as xylylenediamine. Further, the polycyclic aromatic polyamine may be either a poly(aminobenzene) having at least two aminophenyl groups directly bonded to each other, or a compound having at least two aminophenyl groups bonded to each other via a lower alkylene group or an alkylene oxide group. Among them, a diaminodiphenylalkane having two aminophenyl groups bonded to each other via a lower alkylene group is preferable, 4,4'-diaminodiphenylmethane and a derivative thereof are particularly preferable.

The constitutional embodiment of the polyurethane used in the present invention is not particularly limited, and examples thereof include an embodiment where the polyurethane is formed from the polyisocyanate component and the polyrotaxane; an embodiment where the polyurethane is formed from the polyisocyanate component, the polyrotaxane and the high molecular weight polyol component; and an embodiment where the polyurethane is formed from the polyisocyanate component, the polyrotaxane, the high molecular weight polyol component and the low molecular weight polyol component.

The amount of the polyurethane in the resin component of the paint film is preferably 40 mass % or more, more preferably 50 mass % or more, even more preferably 55 mass % or more, and is preferably 100 mass % or less, more preferably 95 mass % or less, even more preferably 90 mass % or less.

The resin component of the paint film according to the present invention may further contain a fluororesin, an acrylic resin or a vinyl chloride-vinyl acetate copolymer and/or a modified product thereof. Among them, the resin component of the paint film according to the present invention preferably contains the vinyl chloride-vinyl acetate copolymer and/or the modified product thereof. This is because, if the vinyl chloride-vinyl acetate copolymer and/or the modified product thereof is contained, the tackiness can be adjusted while maintaining abrasion resistance, and moderate tacky feeling is obtained. Examples of the modification method include a method of copolymerizing a monomer (e.g., vinyl alcohol, hydroxyalkyl acrylate, etc.) copolymerizable with vinyl chloride and vinyl acetate; and a method of partially or completely saponifying a vinyl chloride-vinyl acetate copolymer to introduce hydroxyl groups therein.

The amount of the vinyl chloride component in the vinyl chloride-vinyl acetate copolymer and/or the modified product thereof is preferably 1 mass % or more, more preferably 20 mass % or more, and is preferably 99 mass % or less, more preferably 95 mass % or less. In the present invention, as the vinyl chloride-vinyl acetate copolymer and/or the modified product thereof, a hydroxyl group-modified vinyl chloride-vinyl acetate copolymer is preferably used. Specific examples of the vinyl chloride-vinyl acetate copolymer and/or the modified product thereof include Solbin (registered trademark) A, Solbin AL, Solbin TA2, and Solbin TA3 available from Nissin Chemical Industry Co., Ltd.

In addition, the amount of the vinyl chloride-vinyl acetate copolymer and/or the modified product thereof in the resin component constituting the paint film is preferably 4 mass % or more, more preferably 8 mass % or more, and is preferably 50 mass % or less, more preferably 45 mass % or less.

[Paint Composition]

The paint film of the golf ball according to the present invention is preferably formed from a curing type paint composition including a base material containing a polyol component and a curing agent containing a polyisocyanate component, wherein the polyol component of the base material contains a polyrotaxane. In the present invention, in order to distinguish the composition containing the polyol component in which the polyrotaxane is included and the composition containing the polyisocyanate component, as a matter of convenience, the composition containing the polyol component in which the polyrotaxane is included is referred to as the base material, and the composition containing the polyisocyanate component is referred to as the curing agent. However, the base material may also be referred to as the A agent, and the curing agent may also be referred to as the B agent. Furthermore, the composition containing the polyol component in which the polyrotaxane is included may also be referred to as the curing agent, and the composition containing the polyisocyanate component may also be referred to as the base material.

In the curing type paint composition used in the present invention, the base material preferably contains a compound having reactivity with the isocyanate group included in the curing agent. Specifically, the base material contains (B) the polyol component in which the polyrotaxane is included. Furthermore, the base material of the curing type paint composition preferably contains a vinyl chloride-vinyl acetate copolymer and/or a modified product thereof.

In the curing reaction of the curing type paint composition, the molar ratio (NCO group/OH group) of the isocyanate group (NCO group) included in the curing agent to the hydroxyl group (OH group) included in the base material is preferably 0.1 or more, and more preferably 0.2 or more. If the molar ratio (NCO group/OH group) is less than 0.1, the curing reaction may become insufficient. Further, if the molar ratio (NCO group/OH group) is too large, the amount of the isocyanate group is excessive, and the obtained paint film may become hard and fragile, and the appearance of the obtained paint film may deteriorate. Thus, the molar ratio (NOC group/OH group) is preferably 1.5 or less, more preferably 1.4 or less, and even more preferably 1.3 or less. The reason why the appearance of the obtained paint film deteriorates if the amount of the isocyanate group in the paint becomes excessive is that an excessive amount of the isocyanate group may promote a reaction between the moisture in the air and the isocyanate group, thereby generating a lot of carbon dioxide gas. It is noted that, when the molar ratio NCO/OH in the curing reaction is taken into account, the hydroxyl group included in the base material includes the hydroxyl groups of the polyrotaxane and the polyol, but excludes the hydroxyl groups included in the modified product of the vinyl chloride-vinyl acetate copolymer, the modified silicone which will be described later, and the like.

In the curing reaction, a publicly known catalyst may be used. Examples of the catalyst include a monoamine such as triethylamine and N,N-dimethylcyclohexylamine; a polyamine such as N,N,N',N'-tetramethylethylene diamine and N,N,N',N'',N'''-pentamethyldiethylene triamine; a cyclic diamine such as 1,8-diazabicyclo-[5.4.0]-7-undecene (DBU) and triethylenediamine; and a tin-based catalyst such as dibutyl tin dilaurylate and dibutyl tin diacetate. These catalysts may be used solely, or two or more of these catalysts may be used in combination. Among them, the tin-based catalyst such as dibutyl tin dilaurylate and dibutyl tin diacetate is preferable, and in particular, dibutyl tin dilaurylate is preferably used.

[Solvent]

The curing type paint composition is preferably a solvent based paint containing an organic solvent as a dispersion medium. This is because the polyrotaxane is insoluble in water, and the organic solvent is preferably used. Examples of the preferable solvent include toluene, isopropyl alcohol, xylene, methylethyl ketone, methylethylisobutyl ketone, ethylene glycol monomethyl ether, ethylbenzene, propylene glycol monomethyl ether, isobutyl alcohol, and ethyl acetate. The solvent may be added in either of the base material and the curing agent, and in light of uniformly performing the curing reaction, the solvent is preferably added in the base material and the curing agent, respectively.

The curing type paint composition preferably further contains a modified silicone. If the modified silicone is contained as a leveling agent, unevenness of the coated surface can be reduced, and thus a smooth coated surface can be formed on the surface of the golf ball. Examples of the modified silicone include a modified silicone having an organic group being introduced to a side chain or an end of a polysiloxane skeleton, a polysiloxane block copolymer obtained by copolymerizing a polyether block and/or a polycaprolactone block, etc. with a polysiloxane block, and a modified silicone having an organic group being introduced to a side chain or an end of the polysiloxane block copolymer. The polysiloxane skeleton or the polysiloxane block is preferably linear, and examples thereof include dimethyl polysiloxane, methylphenyl polysiloxane, and methyl hydrogen polysiloxane.

Examples of the organic group include an amino group, epoxy group, mercapto group, and carbinol group. In the present invention, as the modified silicone oil, a polydimethylsiloxane-polycaprolactone block copolymer is preferably used, and a terminal carbinol-modified polydimethylsiloxane-polycaprolactone block copolymer is more preferably used. This is because these block copolymers have excellent compatibility with the caprolactone-modified polyrotaxane and the polycaprolactone polyol. Specific examples of the modified silicone used in the present invention include DBL-C31, DBE-224, and DCE-7521 available from Gelest, Inc.

The modified silicone remains in the paint film formed from the paint composition. The amount of the modified silicone in the paint film and the curing type paint composition is preferably 0.01 part by mass or more, more preferably 0.05 part by mass or more, and is preferably 10 parts by mass or less, more preferably 5 parts by mass or less, with respect to 100 parts by mass of the resin component constituting the paint film.

The curing type paint composition may further contain additives generally included in the paint for a golf ball, such as a filler, ultraviolet absorber, antioxidant, light stabilizer, fluorescent brightener, anti-blocking agent, leveling agent, slip agent, and viscosity modifier, where necessary.

Next, the method of applying the curing type paint composition of the present invention will be described. The method of applying the curing type paint composition is not limited, a conventionally known method can be adopted, and examples thereof include a spray coating and electrostatic coating.

In the case of performing the spray coating with an air gun, the base material and the curing agent are fed with respective pumps and continuously mixed with a line mixer located in the stream line just before the air gun, and the obtained mixture is air-sprayed. Alternatively, the base material and the curing agent are air-sprayed respectively with an air spray system provided with a device for controlling the mixing ratio thereof. The paint application may be conducted by spraying the paint one time or overspraying the paint multiple times.

The curing type paint composition applied to the golf ball body may be dried, for example, at a temperature ranging from 30° C. to 70° C. for 1 hour to 24 hours to form the paint film.

The thickness of the paint film after drying is preferably, without limitation, 5 μm or more, more preferably 6 μm or more, even more preferably 10 μm or more, most preferably 15 μm or more. If the thickness is less than 5 μm, the paint film is likely to wear off due to the continued use, and thickening the paint film increases the spin rate on approach shots. The thickness of the paint film is preferably 50 μm or less, more preferably 45 μm or less, even more preferably 40 μm or less. If the thickness of the paint film is thicker than 50 μm, the dimple effect is lowered, and thus the flying performance of the golf ball tends to be lowered. The thickness of the paint film can be measured, for example, by observing a cross section of the golf ball using a microscope (VHX-1000 available from Keyence Corporation). In the case of overpainting the paint, a total thickness of the formed paint film preferably falls within the above range.

[Golf Ball Body]

The golf ball according to the present invention is not particularly limited, as long as it is a golf ball comprising a golf ball body and a paint film covering the golf ball body. The construction of the golf ball body is not particularly limited, and the golf ball body may be a one-piece golf ball, a two-piece golf ball, a three-piece golf ball, a multi-piece golf ball comprising four or more pieces, or a wound golf ball. The present invention can be applied appropriately to any one of the above golf balls.

Figure 8:
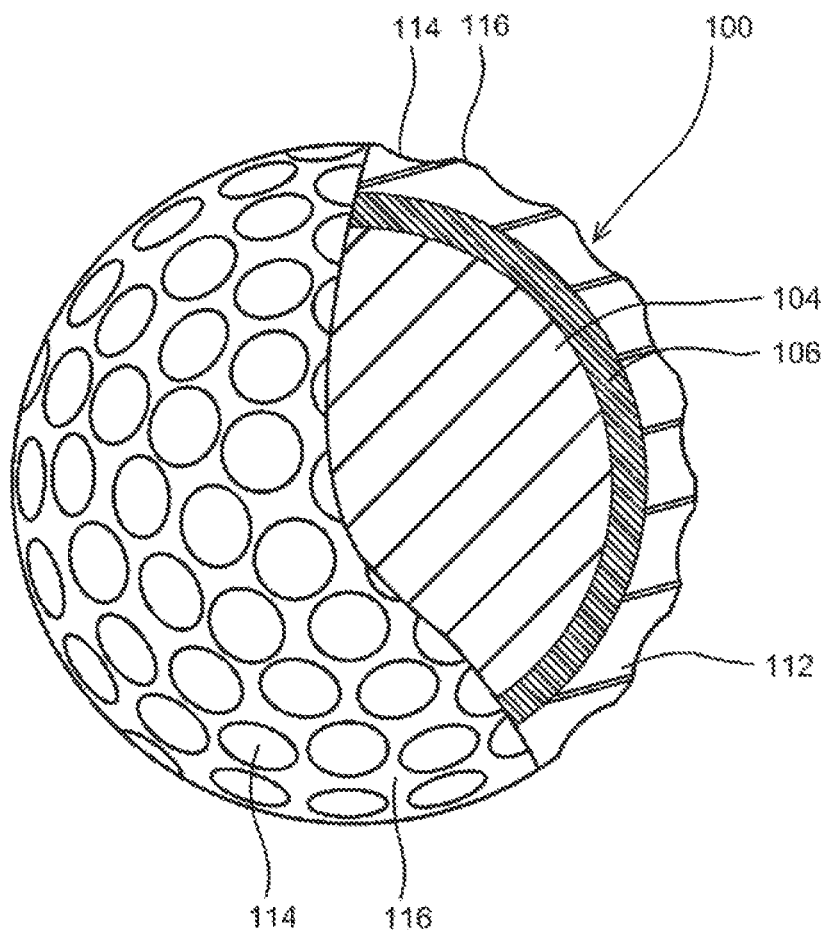
FIG. 8 is a partially cutaway sectional view showing a golf ball according to one embodiment of the present invention.

FIG. 8 is a partially cutaway sectional view showing a golf ball 100 according to one embodiment of the present invention. The golf ball 100 comprises a spherical core 104, an intermediate layer 106 covering the spherical core 104, a cover 112 covering the intermediate layer 106. On the surface of the cover 112, a plurality of dimples 114 are formed. On the surface of the golf ball 100, a part other than the dimples 114 is a land 116. The golf ball 100 further comprises a paint layer and a mark layer on the outer side of the cover 112, but these layers are not depicted.

The golf ball according to the present invention is preferably a golf ball comprising a core and a cover covering the core. In this case, the cover preferably has a hardness of 70 or less, more preferably 65 or less, even more preferably 60 or less, most preferably 50 or less in Shore D hardness. If the cover has a hardness of 70 or less in Shore D hardness, the spin rate on approach shots for a distance of about 40 yards to about 100 yards becomes higher, and thus controllability increases. The lower limit of the hardness of the cover is not particular limited, but the lower limit of the hardness of the cover is preferably 10, more preferably 15, even more preferably 20 in Shore D hardness. The hardness of the cover is a slab hardness obtained by measuring a cover composition for forming the cover molded into a sheet form.

The cover material constituting the cover of the golf ball according to the present invention is not particularly limited, and examples thereof include various resins such as an ionomer resin, a polyester resin, a urethane resin like a thermoplastic urethane resin or a two-component curing type urethane resin, and a polyamide resin; and a thermoplastic polyamide elastomer having a trade name of "Pebax (registered trademark) (e.g. "Pebax 2533")" available from Arkema Inc., a thermoplastic polyester elastomer having a trade name of "Hytrel (registered trademark) (e.g. "Hytrel 3548" and "Hytrel 4047")" available from Du Pont-Toray Co., Ltd., a thermoplastic polyurethane elastomer having a trade name of "Elastollan (registered trademark) (e.g. "Elastollan XNY97A")" available from BASF Japan Ltd, and a thermoplastic styrene elastomer having a trade name of "Rabalon (registered trademark)" and a thermoplastic polyester elastomer having a trade name of "Primalloy" available from Mitsubishi Chemical Corporation. These cover materials may be used solely, or two or more of these cover materials may be used in combination.

The cover may include a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or a fluorescent brightener, or the like, in addition to the above resin component, as long as they do not impair the performance of the cover.

The embodiment for molding the cover from the cover composition is not particularly limited, and examples thereof include an embodiment comprising injection molding the cover composition directly onto the core; and an embodiment comprising molding the cover composition into hollow shells, covering the core with a plurality of the hollow shells and compression molding the core with a plurality of the hollow shells (preferably an embodiment comprising molding the cover composition into half hollow-shells, covering the core with two of the half hollow-shells and compression molding the core with two of the half hollow-shells). After the cover is molded, the obtained golf ball body is ejected from the mold, and as necessary, the golf ball body is preferably subjected to surface treatments such as deburring, cleaning, and sandblast. If desired, a mark may be formed.

The total number of the dimples formed on the cover is preferably 200 or more and 500 or less. If the total number of the dimples is less than 200, the dimple effect is hardly obtained. If the total number exceeds 500, the dimple effect is hardly obtained because the size of the respective dimples is small. The shape (shape in a plan view) of the formed dimple includes, for example, without limitation, a circle; a polygonal shape such as a roughly triangular shape, a roughly quadrangular shape, a roughly pentagonal shape, and a roughly hexagonal shape; and another irregular shape. The shape may be employed solely, or two or more of the shapes may be employed in combination.

The golf ball preferably has a diameter ranging from 40 mm to 45 mm. In light of satisfying a regulation of US Golf Association (USGA), the diameter is preferably 42.67 mm or more. In light of prevention of the air resistance, the diameter is preferably 44 mm or less, more preferably 42.80 mm or less. The golf ball preferably has a mass of 40 g or more and 50 g or less. In light of obtaining greater inertia, the golf ball more preferably has a mass of 44 g or more, even more preferably 45.00 g or more. In light of satisfying a regulation of USGA, the golf ball preferably has a mass of 45.93 g or less.

When the golf ball according to the present invention has a diameter ranging from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard and thus the shot feeling thereof becomes better. On the other hand, if the compression deformation amount is 4.0 mm or less, the resilience of the golf ball becomes better.

Next, the core used for a wound golf ball, two-piece golf ball and multi-piece golf ball, and the one-piece golf ball body will be explained.

The core or the one-piece golf ball body may use a conventionally known rubber composition (hereinafter simply referred to as "core rubber composition" occasionally), and may be formed by heat pressing, for example, a rubber composition containing a base rubber, a co-crosslinking agent and a crosslinking initiator.

As the base rubber, particularly preferred is a high cis-polybutadiene having a cis-bond in a proportion of 40 mass % or more, more preferably 70 mass % or more, and even more preferably 90 mass % or more in view of its advantageous resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent to be used is preferably 20 parts by mass or more and 50 parts by mass or less, with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator to be used is preferably 0.2 part by mass or more, more preferably 0.3 part by mass or more, and is preferably 3 parts by mass or less, more preferably 2 parts by mass or less, with respect to 100 parts by mass of the base rubber. In addition, the core rubber composition may further include an organic sulfur compound. As the organic sulfur compound, diphenyl disulfides, thiophenols or thionaphthols may be preferably used. The amount of the organic sulfur compound to be used is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further include a carboxylic acid and/or a salt thereof. As the carboxylic acid and/or the salt thereof, a carboxylic acid having 1 to 30 carbon atoms and/or a salt thereof is preferred. The amount of the carboxylic acid and/or the salt thereof to be used is preferably 1 part by mass or more and 40 parts by mass or less, with respect to 100 parts by mass of the base rubber.

The core rubber composition may further include a weight adjusting agent such as zinc oxide and barium sulfate, an antioxidant, or a colored powder, in addition to the base rubber, the co-crosslinking agent, the crosslinking initiator, and the organic sulfur compound. The molding conditions for heat pressing the core rubber composition may be determined appropriately depending on the rubber formulation. Generally, the heat pressing is preferably carried out at 130° C. to 200° C. for 10 to 60 minutes, or carried out in a two-step heating of heating at 130° C. to 150° C. for 20 to 40 minutes followed by heating at 160° C. to 180° C. for 5 to 15 minutes.

[Golf Ball]

In the case that the golf ball according to the present invention is a three-piece golf ball or a multi-piece golf ball comprising four or more pieces, examples of the material used for an intermediate layer disposed between the core and the outmost cover include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing, with a metal ion, at least a part of carboxyl groups in a copolymer composed of ethylene and an α,β-unsaturated carboxylic acid; and a product obtained by neutralizing, with a metal ion, at least a part of carboxyl groups in a terpolymer composed of ethylene, an α,β-unsaturated carboxylic acid and an α,β-unsaturated carboxylic acid ester. The intermediate layer may further include a weight adjusting agent such as barium sulfate and tungsten, an antioxidant, and a pigment. The intermediate layer may be referred to as an inner cover layer or an outer core depending on the construction of the golf ball.

Examples

Next, the present invention will be described in detail by way of examples. However, the present invention is not limited to the examples described below. Various changes and modifications without departing from the spirit of the present invention are included in the scope of the present invention.

[Evaluation Methods]

(1) Measurement of Dynamic Viscoelasticity

The storage modulus E' ($dyn/cm^2$), loss modulus E" ($dyn/cm^2$) and loss tangent (tan δ) of the paint film were measured under the following conditions.

Apparatus: dynamic viscoelasticity measuring apparatus Rheogel-E4000 available from UBM Co. Ltd.

Measuring sample: The base material and curing agent were blended to prepare a paint. The paint was dried and cured at 40° C. for 4 hours to prepare a paint film having a thickness ranging from 0.11 mm to 0.14 mm. The paint film was punched out to prepare a test piece having a width of 4 mm and a distance between the clamps of 20 mm.

Measuring mode: tensile mode

Measuring temperature: from −100° C. to 150° C.

Temperature rising rate: 4° C./min

Measuring data capturing interval: 4° C.

Oscillation frequency: 10 Hz
Measuring strain: 0.1%

(2) 10% Modulus of Elasticity of Paint Film

A paint obtained by blending the base material and curing agent was dried and cured at 40° C. for 4 hours to prepare a paint film. According to JIS-K7161, this paint film was punched as a dumbbell shape to prepare a test piece, and the physical properties of the test piece were measured by using a tensile tester available from Shimadzu Corporation, and the modulus of elasticity of the test piece at 10% elongation was calculated.

Thickness of test piece: 0.05 mm
Tension speed: 50 mm/min (3) Measurement of Coefficient of Friction (Dry)

The contact force tester shown in FIG. 1 was used to measure the coefficient of friction (dry) of the golf ball.

1. Specification of Tester
   (A) Launcher: air gun system
   (B) Collision plate:
   Base plate 4a
     Steel
     Thickness: 5.35 mm
   Superficial plate 4c
   Main body 4c1
     Size: 56 mm×56 mm×15 mm
     Stainless steel (SUS-630)
   Superficial material 4c2
     Size: 56 mm×56 mm×2.5 mm
     Metal composition: SUS-431
     Groove shape: see FIG. 4
     Angle of inclination ($\alpha$)
     35 degrees (to flying direction of golf ball)
   (C) Pressure sensor 4b
   3-component force sensor (model 9067) available from Kistler Instrument Corporation
   Charge amplifier
   Model 5011B available from Kistler Instrument Corporation
   (D) Capture of contact force into PC A pulse counter board PCI-6101 (available from Interface Corporation) was used. With a 16-bit PCI pulse counter board having 4 channels, measurement suited for a specific application may be realized in four counter modes. The maximum input frequency is 1 MHz.

Figure 4:
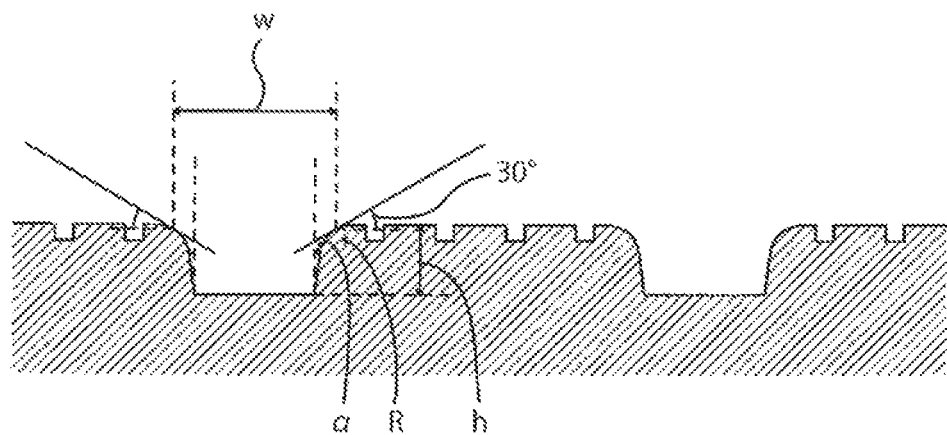
FIG. 4 is a cross-sectional view of a groove shape of a surface layer material of the contact force tester.
Figure 4:
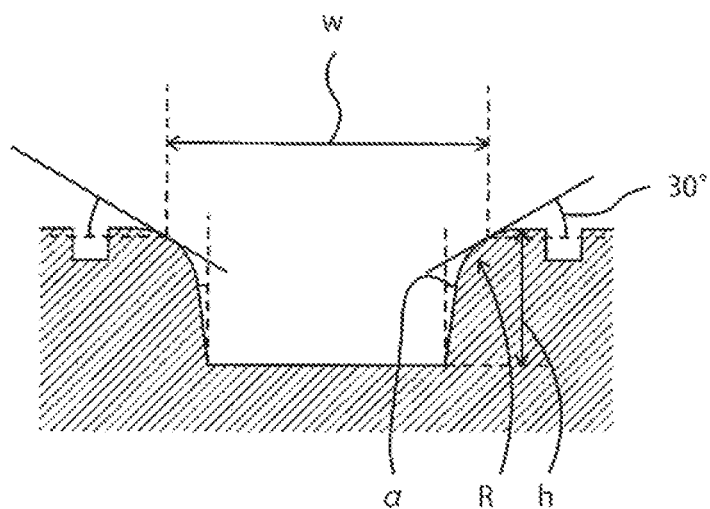

As shown in FIG. 4, the groove structure of a sand wedge CG-15 available from Cleveland Golf is reproduced on the striking face 3 of the collision plate 4. As shown in FIG. 4(a), on the striking face 3, large grooves (zip grooves) are formed, and a plurality of small grooves are formed on the surface between the large grooves (zip grooves). FIG. 4(b) is an enlarged view of cross-section structure of the zip groove. The dimensions of the zip groove are as follow.

Zip groove (groove) width W: 0.70 mm
Zip groove (groove) depth h: 0.50 mm
Zip groove (groove) pitch: 3.56 mm
Zip groove (groove) angle $\alpha$: 10°
Zip groove shoulder R: 0.25

A plurality of small grooves between the zip grooves are formed by a laser-milling method such that the surface portion between the zip grooves has a surface roughness Ra=2.40±0.8 μm and Rmax=14.0±8 μm. It is noted that the surface roughness Ra and Rmax are measured by using SJ-301 available from Mitsutoyo Corporation under the conditions of specimen length=2.5 mm and cut off value=2.5 mm.

2. Measuring Procedure

The coefficient of friction was measured according to the following method.

(a) Setting the angle ($\alpha$) of the collision plate at 35 degrees to the flying direction (vertical direction) of the golf ball;
(b) Adjusting the air pressure of the launcher 5;
(c) Launching the golf ball from the launcher (launch speed: 19 m/sec);
(d) Measuring the initial velocity of the golf ball from the preset distance between the sensor S1 and sensor S2 and the time difference between the times for the golf ball to pass through the sensors S1 and S2; and
(e) Measuring the contact force Fn(t) and contact force Ft(t), and calculating the maximum value of Ft(t)/Fn(t).

3. Result of Measurement

Figure 5:
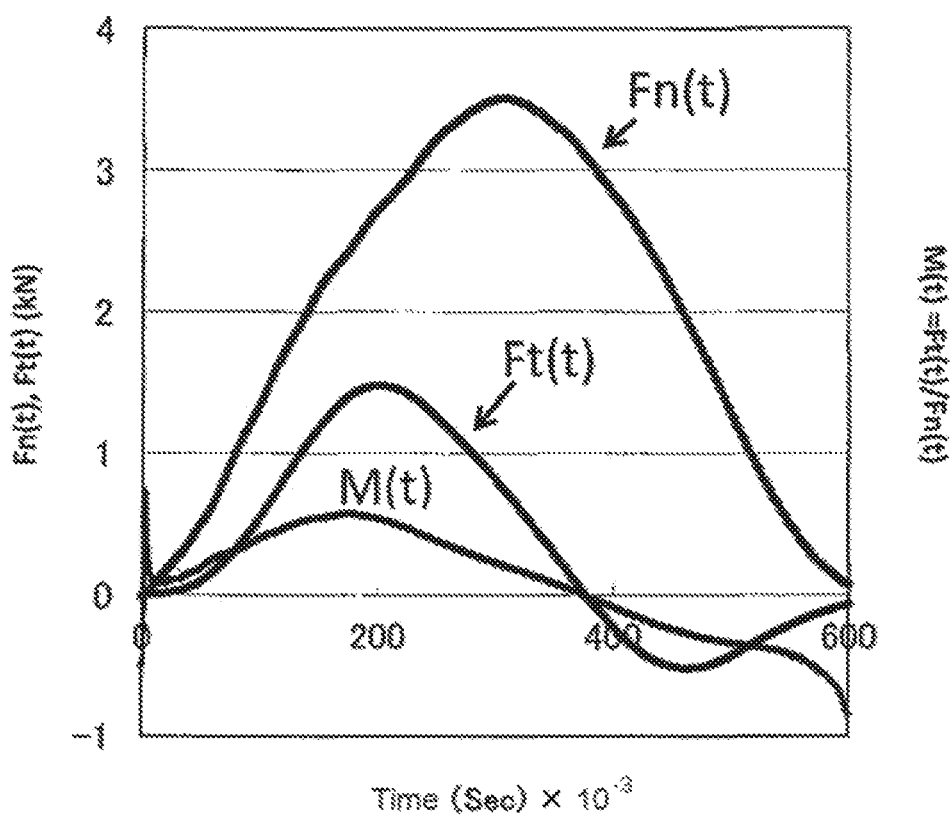
FIG. 5 is a graph illustrating an example of Ft(t), Fn(t) and M(t)

One example of the results obtained with the above tester in the above measuring procedure is shown in FIG. 5. From FIG. 5, the value of M(t) was calculated as Ft(t)/Fn(t), and the maximum value thereof was 0.58. Since noise tends to generate in initial period where the contact force rises up and in terminal period for measuring Ft and Fn, the maximum value of M(t) was calculated after trimming an early stage of the initial period and late stage of the terminal period.

(4) Measurement of Wet Paper Slit Coefficient of Friction

Figure 6:
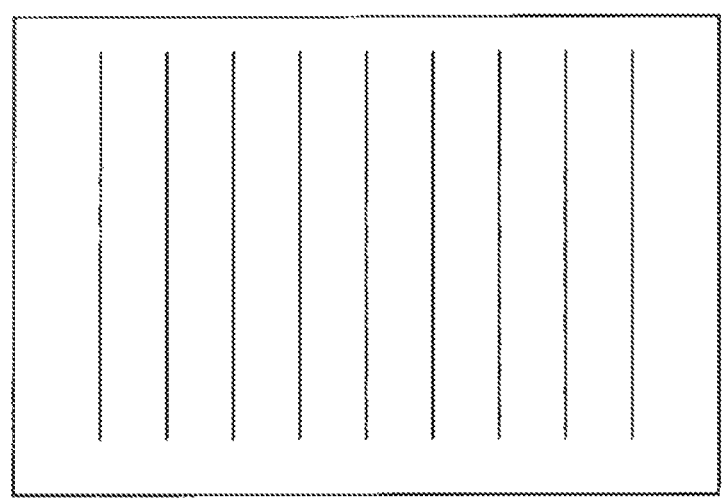
FIG. 6 is an explanatory drawing illustrating one embodiment of formed slits of a wet paper when measuring a coefficient of friction (wet)

As shown in FIG. 6, slits were formed at an interval of 5 mm on Sontar maintenance cloth thick type (size: 56 mm×56 mm) available from E. I. du Pont de Nemours and Company, and the cloth was wetted with water and attached on the collision plate. At this time, the cloth was attached such that the grooves formed on the collision plate and the slits are perpendicular to one another. Except that the launch speed of the golf ball was changed to 9 m/sec, the wet paper slit coefficient of friction and spin rate were measured by the same method and under the same conditions as those in the measurement of the coefficient of friction (dry). It is noted that the spin rate is represented by a spin rate difference obtained by subtracting the spin rate of Golf ball No. 9 from that of each golf ball.

(5) Spin Rate and Launch Angle on Approach Shots for Less than 40 Yards

A sand wedge (CG 15 forged wedge (52°) available from Cleveland Golf) was installed on a swing robot M/C available from True Temper Sports, Inc. The golf ball was hit at a head speed of 21 m/sec, and the spin rate (rpm) thereof was measured by continuously taking a sequence of photographs of the hit golf ball. This measurement was conducted ten times for each golf ball, and the average value thereof was adopted as the spin rate. The launch angle was determined by measuring, with a unidimensional CCD sensor, the shadow of the ball passing through a light screen that was emitted from a linear laser light source located in front of the direction of hitting the ball with the swing robot M/C. The launch angle and spin rate are represented by a difference obtained by subtracting the launch angle and spin rate of Golf ball No. 9 from those of each golf ball.

(6) Shot Feeling

An actual hitting test was carried out by ten amateur golfers (high skilled persons) using a sand wedge (CG 15 forged wedge (52°) available from Cleveland Golf). In accordance with the number of people who answered the shot feeling was good (feeling like that the golf ball was lifted on the club face, feeling like that the golf ball gripped on the club surface, feeling like that the spin was imparted, feeling like that the golf ball was stuck on the club face, etc.), the golf balls were evaluated as follows.

E (Excellent): 9 or more
G (Good): 6 to 8
F (Fair): 3 to 5
P (Poor): 2 or less (7) Compression Deformation Amount (mm)

The deformation amount of the core or golf ball along the compression direction (shrinking amount of the core or golf ball along the compression direction), when applying a load from 98 N as an initial load to 1275 N as a final load to the core or golf ball, was measured.

[Production of Three-Piece Golf Ball]

(1) Production of Spherical Core

The core rubber composition having the formulation shown in Table 1 was kneaded, and heat-pressed in upper and lower molds, each having a hemispherical cavity, at 170° C. for 20 minutes to obtain the spherical core having a diameter 39.7 mm.

TABLE 1

| Core composition | Parts by mass |
| --- | --- |
| Polybutadiene rubber | 100 |
| Zinc acrylate | 38 |
| Zinc oxide | 5 |
| Barium sulfate | Appropriate amount*) |
| Diphenyl disulfide | 0.5 |
| Dicumyl peroxide | 0.8 |
| Diameter (mm) | 39.7 |
| Surface hardness (Shore D) | 58 |
| Center hardness (Shore D) | 41 |
| Compression deformation amount (mm) | 2.7 |

*)Adjustment was made such that the golf ball had a mass of 45.3 g.

Polybutadiene rubber: "BR730 (high cis-polybutadiene)" available from JSR Corporation
Zinc acrylate: ZN-DA90S (product of 10% zinc stearate coating) available from Nihon Jyoryu Kogyo Co., Ltd.
Zinc oxide: "Ginrei R" available from Toho Zinc Co., Ltd.
Barium sulfate: "Barium Sulfate BD" available from Sakai Chemical Industry Co., Ltd.
Diphenyl disulfide: available from Sumitomo Seika Chemicals Co., Ltd.
Dicumyl peroxide: "Percumyl (register trademark) D" available from NOF Corporation (2) Preparation of Intermediate Layer Composition and Cover Composition The materials having the formulations shown in Tables 2, 3 were mixed with a twin-screw kneading extruder to prepare the intermediate layer composition and cover composition in a pellet form. The extruding conditions were a screw diameter of 45 mm, a screw rotational speed of 200 rpm, and screw L/D=35, and the mixtures were heated to 200° C. to 260° C. at the die position of the extruder.

TABLE 2

| Intermediate layer composition | Parts by mass |
| --- | --- |
| Himilan 7337 | 50 |
| Himilan AM7329 | 50 |
| Slab hardness (Shore D) | 65 |

Himilan 7337: zinc ion neutralized ethylene-methacrylic acid copolymer ionomer resin available from Du Pont-Mitsui Polychemicals Co., Ltd.

Himilan AM7329: sodium ion neutralized ethylene-methacrylic acid copolymer ionomer resin available from Du Pont-Mitsui Polychemicals Co., Ltd.

TABLE 3

| Cover composition | Parts by mass |
| --- | --- |
| Elastollan XNY85A | 100 |
| Titanium oxide | 4 |
| Slab hardness (Shore D) | 32 |

Elastollan XNY85A: thermoplastic polyurethane elastomer (Shore D hardness: 32) available from BASF Japan Ltd.

(3) Production of Intermediate Layer

The intermediate layer composition obtained above was directly injection molded on the spherical core obtained as described above to produce the intermediate layer. Upper and lower molds for molding have a hemispherical cavity and a retractable hold pin holding the spherical core. When molding the intermediate layer, the hold pin was protruded to hold the spherical core after the spherical core was charged, and the intermediate layer composition heated to 260° C. was charged for 0.3 second into the mold held under a pressure of 80 tons, and cooled for 30 seconds to mold the intermediate layer (thickness: 1 mm).

(4) Molding of Half Shell

The compression molding of the half shells was conducted by charging a pellet of the cover composition into each of the depressed part of the lower mold for molding half shells, and applying pressure to mold half shells. The compression molding was conducted under the conditions of a molding temperature of 170° C., a molding time of 5 minutes and a molding pressure of 2.94 MPa.

(5) Molding of Cover

The spherical body having the intermediate layer covered thereon and obtained in (3) was concentrically covered with two of the half shells obtained in (4), and the spherical body and two of the half shells were compression molded to obtain the cover (thickness: 0.5 mm). The compression molding was conducted under the conditions of a molding temperature of 145° C., a molding time of 2 minutes and a molding pressure of 9.8 MPa.

(6) Preparation of Paint

Figure 9:
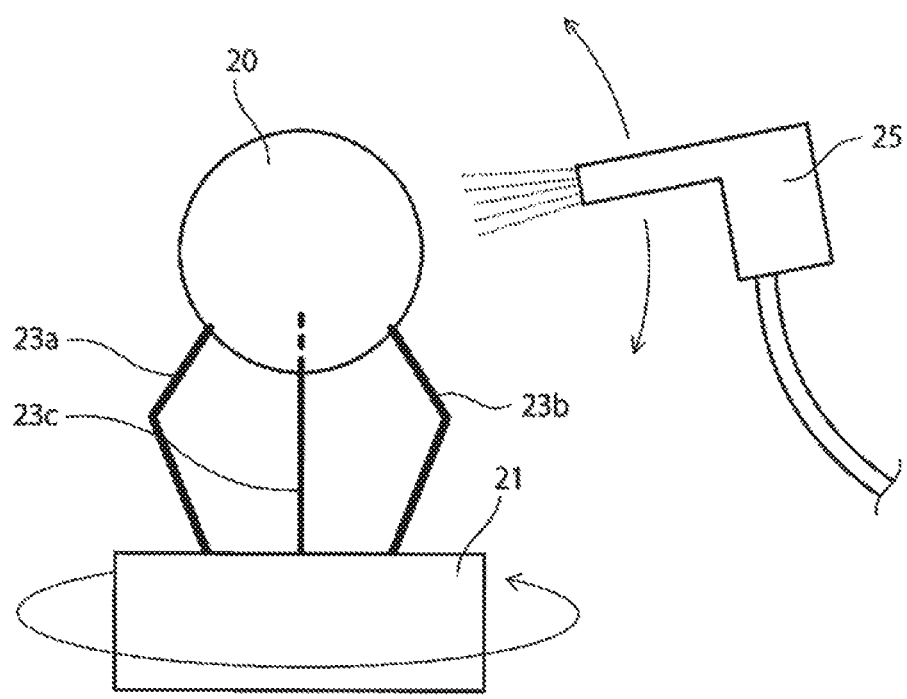
FIG. 9 is a schematic view showing an example of an application embodiment using an air gun.
Figure 10:
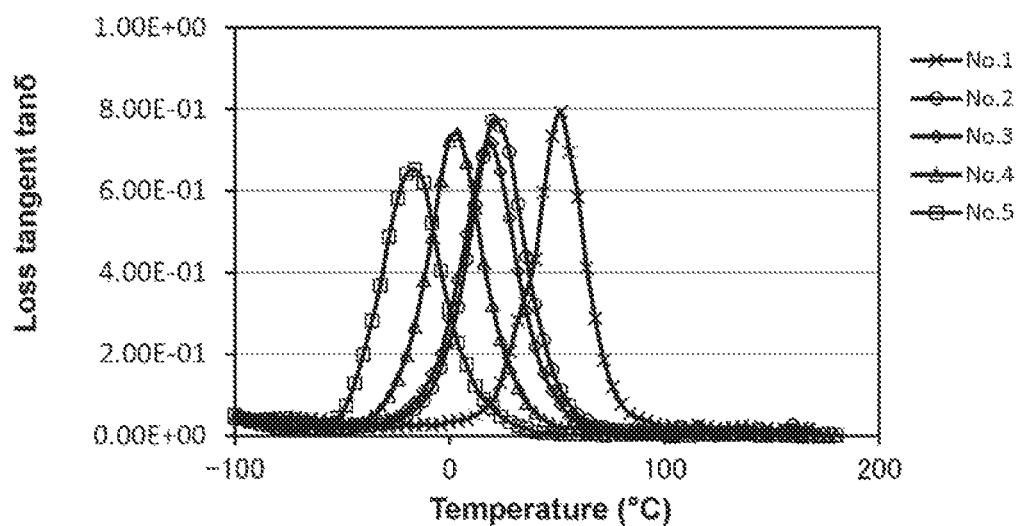
FIG. 10 is a graph showing a relationship between a loss tangent (tan δ) of a paint film and a temperature.
Figure 11:
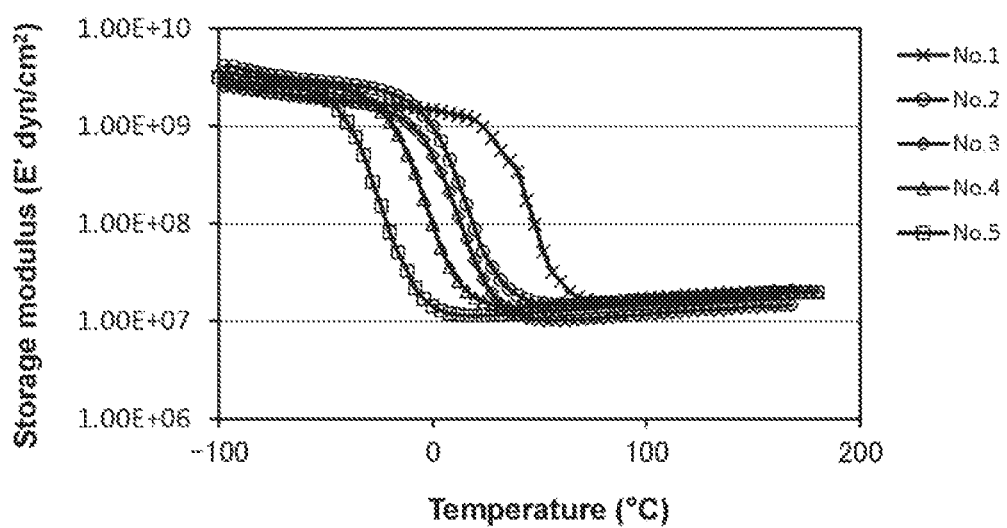
FIG. 11 is a graph showing a relationship between a storage modulus (E') of a paint film and a temperature.
Figure 12:
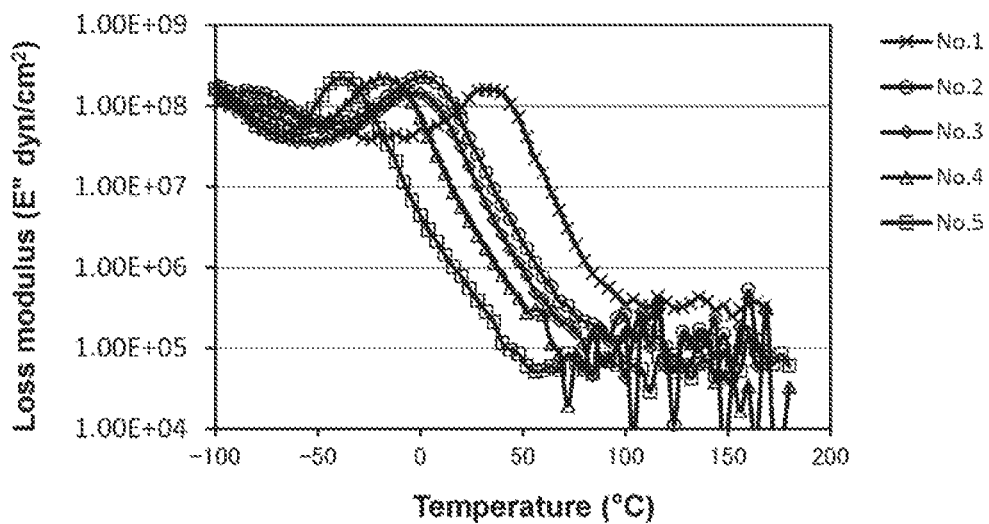
FIG. 12 is a graph showing a relationship between a loss modulus (E") of a paint film and a temperature.
Figure 13:
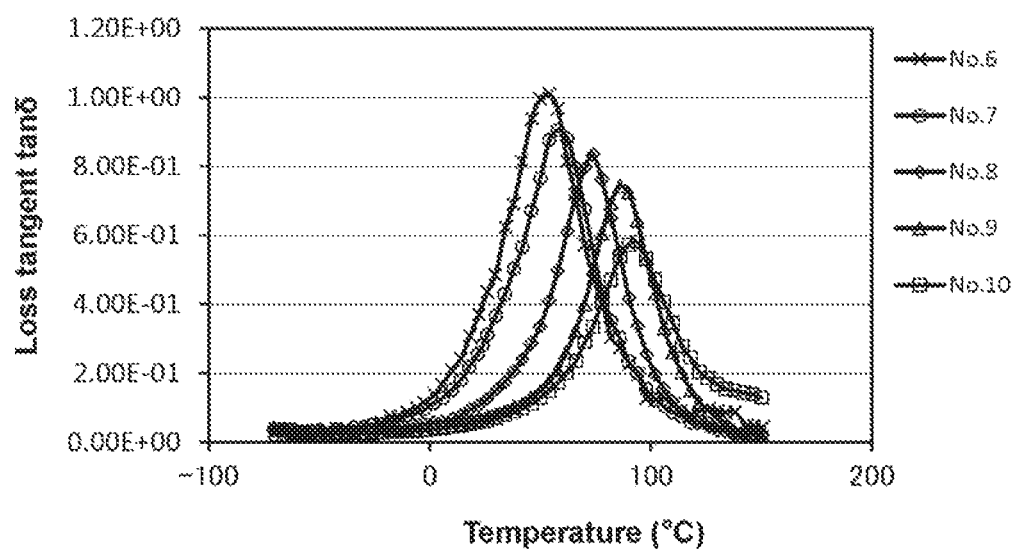
FIG. 13 is a graph showing a relationship between a loss tangent (tan δ) of a paint film and a temperature.
Figure 14:
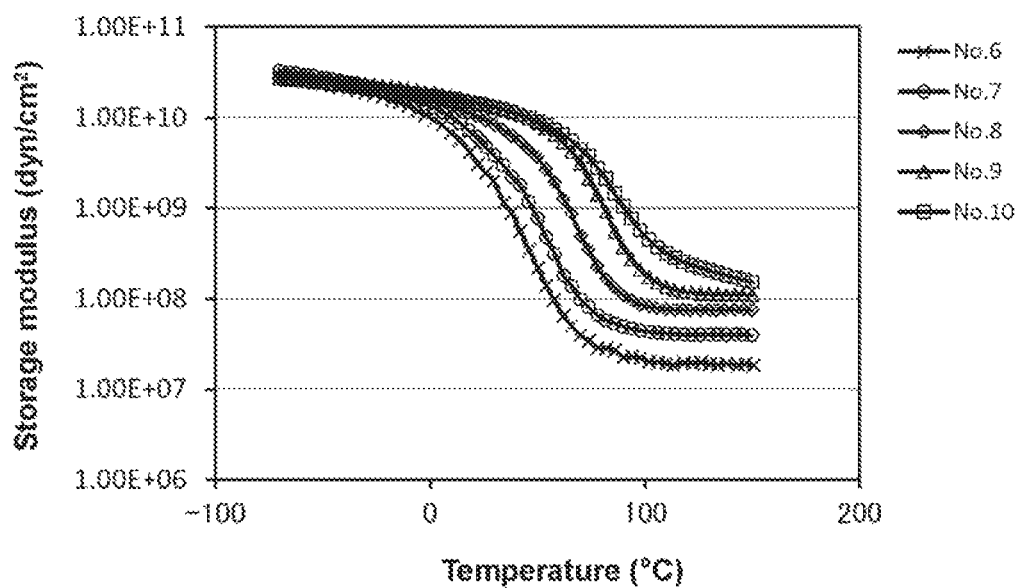
FIG. 14 is a graph showing a relationship between a storage modulus (E') of a paint film and a temperature.
Figure 15:
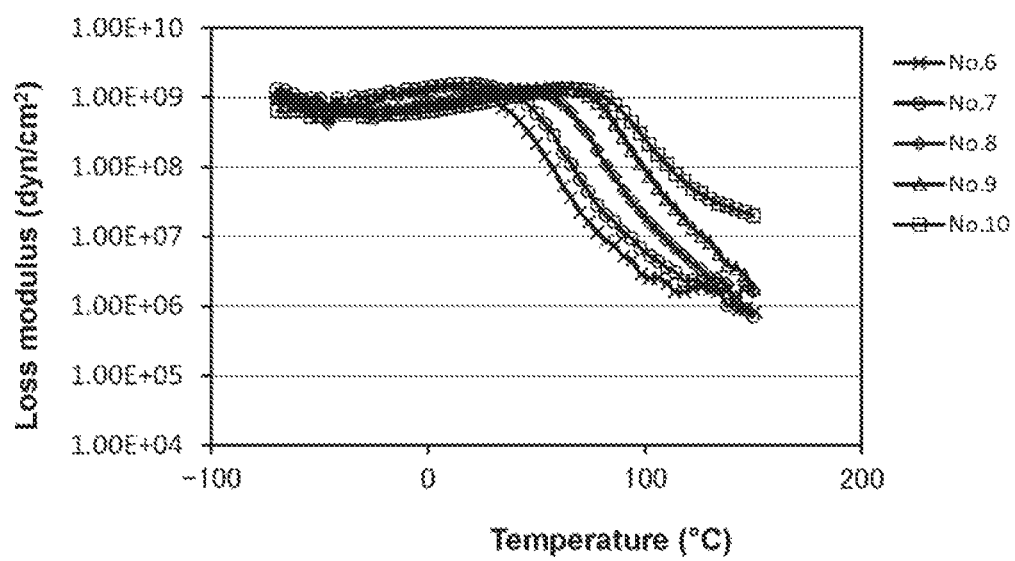
FIG. 15 is a graph showing a relationship between a loss modulus (E") of a paint film and a temperature.

The materials shown in Table 4 were blended to prepare the paint compositions. The surface of the golf ball body obtained above was subjected to a sandblast treatment, and a mark was formed thereon. Then, the paint was applied to the golf ball body with a spray gun, and the paint was dried in an oven of 40° C. for 24 hours to obtain the golf ball having a diameter of 42.7 mm and a mass of 45.3 g. The thickness of the paint film was set in a range of from 20 μm to 40 μm. The golf ball body was placed in a rotating member shown in FIG. 9, the rotating member was allowed to rotate at 300 rpm, and application of the paint was conducted by spacing a spray distance (7 cm) between the air gun and the golf ball body while moving the air gun in an up and down direction. The painting interval in the overpainting operation was set to 1.0 second. Application of the paint was conducted under the air gun spraying conditions of a spraying air pressure: 0.15 MPa, a compressed air tank pressure: 0.10 MPa, a painting time for one application: 1 second, an atmosphere temperature: 20° C. to 27° C., and an atmosphere humidity: 65% or less. Evaluation results of the spin performance of the obtained golf balls are shown in Table 4. In addition, measurement results of the dynamic viscoelasticity of the paint film formed from each paint are shown in FIG. 10 to FIG. 15.

TABLE 4

| | | Golf ball No. | | | | | | | | | |
|---|---|---|---|---|---|---|---|---|---|---|---|
| | | 1 | 2 | 3 | 4 | 5 | 6 | 7 | 8 | 9 | 10 |
| Base material formulation (parts by mass) | Polyrotaxane | — | 36 | 50 | 70 | 100 | — | — | — | — | — |
| | Polycaprolactone polyol | 56 | 36 | 28 | 17 | — | — | — | — | — | — |
| | Modified product of vinyl chloride-vinyl acetate copolymer | 44 | 28 | 22 | 13 | — | — | — | — | — | — |
| | Modified silicone | 0.1 | 0.1 | 0.1 | 0.1 | 0.1 | — | — | — | — | — |
| | Dibutyl tin dilaurate | 0.01 | 0.01 | 0.01 | 0.01 | 0.01 | — | — | — | — | — |
| | Solvent | 100 | 100 | 100 | 100 | 100 | — | — | — | — | — |
| | Polin #950 | — | — | — | — | — | 100 | 100 | 100 | 100 | 100 |
| Curing agent formulation (parts by mass) | HDI biuret-modified product | — | — | — | — | — | 30 | 30 | 30 | 30 | 30 |
| | HDI isocyanurate | 100 | 100 | 100 | 100 | 100 | 30 | 30 | 30 | 30 | 30 |
| | IPDI isocyanurate | — | — | — | — | — | 40 | 40 | 40 | 40 | 40 |
| | Solvent | 100 | 100 | 100 | 100 | 100 | 100 | 100 | 100 | 100 | 100 |
| Mixing ratio of curing agent/base material (NCO/OH molar ratio) | | 1.2/1.0 | 1.2/1.0 | 1.2/1.0 | 1.2/1.0 | 1.2/1.0 | 0.38/1.0 | 0.5/1.0 | 0.8/1.0 | 1.2/1.0 | 1.6/1.0 |
| 10% Modulus of elasticity of paint film (kgf/cm$^2$) | | 35 | 8 | 8 | 8 | 8 | 8 | 38 | 126 | 186 | 275 |
| Storage modulus of elasticity E' of paint film at 23° C. (×10$^7$ dyn/cm$^2$) | | 97.8 | 5.22 | 2.71 | 1.59 | 1.15 | 309 | 543 | 1030 | 1390 | 1470 |
| Loss modulus of elasticity E" of paint film at 23° C. (×10$^7$ dyn/cm$^2$) | | 12.6 | 3.97 | 1.76 | 0.377 | 0.055 | 115 | 153 | 111 | 96.3 | 84.0 |
| Peak temperature of loss tangent (tan δ) of paint film (° C.) | | 52 | 20 | 20 | 4 | −16 | 54 | 58 | 74 | 86 | 94 |
| Peak height of loss tangent (tan δ) of paint film | | 0.793 | 0.771 | 0.716 | 0.740 | 0.652 | 1.01 | 0.906 | 0.835 | 0.743 | 0.581 |
| Physical properties of golf ball | Compression deformation amount (mm) | 2.65 | 2.65 | 2.65 | 2.65 | 2.65 | 2.65 | 2.65 | 2.65 | 2.65 | 2.65 |
| | Spin rate of golf ball (rpm) | 370 | 480 | 520 | 550 | 590 | 390 | 360 | 255 | 0 | −75 |
| | Launch angel (°) | −1.72 | −1.98 | −2.06 | −2.21 | −2.39 | −1.64 | −1.44 | −1.01 | 0 | 0.29 |
| | Coefficient of friction (dry) | 0.42 | 0.49 | 0.51 | 0.54 | 0.57 | 0.46 | 0.42 | 0.38 | 0.32 | 0.28 |
| | Wet paper slit coefficient of friction | 0.13 | 0.20 | 0.24 | 0.24 | 0.23 | 0.17 | 0.16 | 0.15 | 0.13 | 0.11 |
| | Spin rate difference (wet paper slit) | 90 | 570 | 680 | 675 | 620 | 300 | 220 | 160 | 0 | −80 |
| | Shot feeling | E | E | E | E | E | E | G | G | F | P |

The raw materials used in Table 4 are shown below.
Base Material
Polyrotaxane: "SeRM (registered trademark) super polymer SH3400P (a polyrotaxane having a cyclodextrin, at least a part of hydroxyl groups thereof being modified with a caprolactone chain via —O—C$_3$H$_6$—O— group, a linear molecule of polyethylene glycol and a blocking group of an adamantyl group; molecular weight of linear molecule: 35,000, hydroxyl value: 72 mg KOH/g, total molecular weight of polyrotaxane: 700,000 in weight average molecular weight) available from Advanced Softmaterials Inc.
Polycaprolactone polyol: Placcel 308 available from Daicel Chemical Industries, Ltd.
Modified product of vinyl chloride-vinyl acetate copolymer: Solbin AL (hydroxyl-modified vinyl chloride-vinyl acetate copolymer) available from Nissin Chemical Industry Co., Ltd.
Modified silicone: DBL-C31 available from Gelest, Inc.
Solvent: mixed solvent of xylene/methylethyl ketone=70/30 (mass ratio)
Polin #950: urethane polyol having a hydroxyl value of 128 mg KOH/g and formed from a polyol component (trimethylolpropane and polyoxytetramethylene glycol) and a polyisocyanate component (isophorone diisocyanate), available from Shinto Paint Co., Ltd.
Curing Agent
Isocyanurate of hexamethylene diisocyanate (HDI isocyanurate): Duranate TKA-100 (NCO content: 21.7%) available from Asahi Kasei Chemicals Corporation
Biuret-modified product of hexamethylene diisocyanate (HDI biuret-modified product): Duranate 21S-75E (NCO content: 15.5%) available from Asahi Kasei Chemicals Corporation Isocyanurate of isophorone diisocyanate (IPDI isocyanurate): VESTANAT T1890 (NCO content: 12.0%) available from Degussa Co., Ltd.
Solvent: methylethyl ketone It is apparent from the results of Table 4 that the golf ball according to the present invention has a low launch angle and a high spin rate on approach shots for less than 40 yards, in particular, on approach shots around the green (about 10 yards to 20 yards), and thus has excellent controllability performance. Furthermore, the golf ball according to the present invention has excellent shot feeling. The golf ball according to the present invention comprises a golf ball body and a paint film covering the golf ball body, wherein a loss tangent tan δ has a peak temperature of 50° C. or less and a peak height of less than 0.8, obtained by measuring dynamic viscoelasticity of the paint film.

The present invention is useful for painted golf balls. This application is based on Japanese patent application No. 2016-104568 filed on May 25, 2016, the content of which is hereby incorporated by reference.

The invention claimed is:

1. A golf ball comprising a golf ball body and a paint film covering the golf ball body, wherein the paint film contains a polyurethane as a resin component, and the polyurethane comprises, as a constituent component, (A) a polyisocyanate component containing an isocyanurate of hexamethylene diisocyanate and (B) a polyol component containing a polyrotaxane,
wherein the polyrotaxane has a cyclodextrin, a linear molecule piercing through the cyclic structure of the cyclodextrin, and blocking groups located at both terminals of the linear molecule to prevent disassociation of the cyclodextrin, and at least a portion of hydroxyl groups of the cyclodextrin is modified with a caprolactone chain expressed by —(CO(CH$_2$)$_5$O)$_n$H via —O—C$_3$H$_6$—O— group, wherein n represents the degree of polymerization and is a natural number of 2 to 70, and wherein a loss tangent tan δ has a peak temperature of 50° C. or less and a peak height of less than 0.8, obtained by measuring dynamic viscoelasticity of the paint film under the following conditions:

<Measuring conditions>
Measuring mode: tensile mode
Measuring temperature range: from −100° C. to 150° C.
Temperature rising rate: 4° C./min
Oscillation frequency: 10 Hz
Measuring strain: 0.1%.

2. The golf ball according to claim 1, wherein the paint film has a storage modulus (E') ranging from $5.0 \times 10^6$ dyn/cm$^2$ to $1.0 \times 10^9$ dyn/cm$^2$ at 23° C.

3. The golf ball according to claim 1, wherein the paint film has a loss modulus (E") ranging from $1.0 \times 10^5$ dyn/cm$^2$ to $6.0 \times 10^7$ dyn/cm$^2$ at 23° C.

4. The golf ball according to claim 1, wherein the paint film has a 10% modulus of elasticity ranging from 2 kgf/cm$^2$ to 130 kgf/cm$^2$.

5. The golf ball according to claim 1, wherein the golf ball has a coefficient of friction of 0.48 or more, calculated using a contact force tester.

6. The golf ball according to claim 1, wherein the golf ball has a wet paper slit coefficient of friction of 0.18 or more, calculated using a contact force tester.

7. The golf ball according to claim 1, wherein the linear molecule of the polyrotaxane is polyethylene glycol, and the blocking group of the polyrotaxane is an adamantyl group.

8. The golf ball according to claim 1, wherein (B) the polyol component further contains at least one selected from the group consisting of a polyether polyol, a polyester polyol, a polycaprolactone polyol, a polycarbonate polyol, and an acrylic polyol.

9. The golf ball according to claim 1, wherein (B) the polyol component contains the polyrotaxane in an amount ranging from 10 mass % to 100 mass %.

10. The golf ball according to claim 1, wherein the paint film further contains a vinyl chloride-vinyl acetate copolymer and/or a modified product thereof as a resin component.

11. The golf ball according to claim 1, wherein the paint film further contains a modified silicone.

12. The golf ball according to claim 11, wherein the paint film contains the modified silicone in an amount ranging from 0.01 part by mass to 10 parts by mass, with respect to 100 parts by mass of the resin component.

13. The golf ball according to claim 10, wherein an amount of the vinyl chloride-vinyl acetate copolymer and/or the modified product thereof in the resin component constituting the paint film ranges from 4 mass % to 50 mass %.

14. The golf ball according to claim 1, wherein the paint film further contains a vinyl chloride-vinyl acetate copolymer and/or a modified product thereof as a resin component, and further contains a modified silicone.

15. The golf ball according to claim 14, wherein the paint film contains the modified silicone in an amount ranging from 0.01 part by mass to 10 parts by mass, with respect to 100 parts by mass of the resin component, and an amount of the vinyl chloride-vinyl acetate copolymer and/or the modified product thereof in the resin component constituting the paint film ranges from 4 mass % to 50 mass %.

16. The golf ball according to claim 1, wherein the golf ball comprises a core and a cover covering the core, and the cover has a hardness of 70 or less in Shore D hardness.

17. The golf ball according to claim 1, wherein the paint film has a storage modulus (E') ranging from $5.0 \times 10^6$ dyn/cm$^2$ to $1.0 \times 10^9$ dyn/cm$^2$ at 23° C., a loss modulus (E") ranging from $1.0 \times 10^5$ dyn/cm$^2$ to $6.0 \times 10^7$ dyn/cm$^2$ at 23° C., and a 10% modulus of elasticity ranging from 2 kgf/cm$^2$ to 130 kgf/cm$^2$; and the golf ball has a coefficient of friction of 0.48 or more, calculated using a contact force tester, and a wet paper slit coefficient of friction of 0.18 or more, calculated using a contact force tester.

18. A golf ball comprising a golf ball body and a paint film covering the golf ball body, wherein the paint film contains a polyurethane as a resin component, and the polyurethane comprises, as a constituent component, (A) a polyisocyanate component and (B) a polyol component containing a polyrotaxane and at least one selected from the group consisting of a polyether polyol, a polyester polyol, a polycaprolactone polyol, a polycarbonate polyol, and an acrylic polyol, wherein the polyrotaxane has a cyclodextrin, a linear molecule piercing through the cyclic structure of the cyclodextrin, and blocking groups located at both terminals of the linear molecule to prevent disassociation of the cyclodextrin, and at least a portion of hydroxyl groups of the cyclodextrin is modified with a caprolactone chain expressed by —(CO(CH$_2$)$_5$O)$_n$H via —O—C$_3$H$_6$—O— group, wherein n represents the degree of polymerization and is a natural number of 2 to 70, and wherein a loss tangent tan δ has a peak temperature of 50° C. or less and a peak height of less than 0.8, obtained by measuring dynamic viscoelasticity of the paint film under the following conditions:

<Measuring conditions>
Measuring mode: tensile mode
Measuring temperature range: from −100° C. to 150° C.
Temperature rising rate: 4° C./min
Oscillation frequency: 10 Hz
Measuring strain: 0.1%.

* * * * *